(12) United States Patent
Wyatt et al.

(10) Patent No.: US 8,079,373 B2
(45) Date of Patent: Dec. 20, 2011

(54) APPLICATOR WITH HELICAL APPLICATOR SURFACE

(75) Inventors: Peter Jonathan Wyatt, Forest Hill, MD (US); Ronald Alan Sanford, York, PA (US); David Edward Wilson, Reisterstown, MD (US); Thomas Elliot Rabe, Baltimore, MD (US)

(73) Assignee: The Proctor & Gamble Company, Cincinnati, OH (US)

( * ) Notice: Subject to any disclaimer, the term of this patent is extended or adjusted under 35 U.S.C. 154(b) by 1003 days.

(21) Appl. No.: 11/857,313

(22) Filed: Sep. 18, 2007

(65) Prior Publication Data

US 2009/0071499 A1 Mar. 19, 2009

(51) Int. Cl.
*A45D 40/26* (2006.01)
(52) U.S. Cl. ........................................ 132/218; 132/320
(58) Field of Classification Search .................. 132/218, 132/318, 320; 15/34, 164.011, 104.04, 167.3, 15/220.4, 182, 104.94, 23–24; 401/268
See application file for complete search history.

(56) References Cited

U.S. PATENT DOCUMENTS

| 386,453 A | 7/1888 | Roberts |
|---|---|---|
| 474,795 A | 5/1892 | Hantman |
| 2,154,812 A | 4/1939 | Hauser |
| 2,290,454 A | 7/1942 | Leon |
| D145,158 S | 7/1946 | Derham |
| D154,653 S | 8/1949 | Beckler |
| 2,625,157 A | 1/1953 | Lockhart |
| D185,339 S | 5/1959 | Wolff |
| 2,975,467 A | 3/1961 | Stanzel |
| 3,132,743 A | 5/1964 | Wolff |
| 3,156,335 A | 11/1964 | Richard |
| 3,235,897 A * | 2/1966 | Fortenberry ............... 15/24 |
| 3,431,571 A | 3/1969 | Kraus |
| 3,432,069 A | 3/1969 | Craig |
| 3,661,018 A | 5/1972 | Keefer |
| 3,699,952 A | 10/1972 | Waters |
| 3,998,235 A | 12/1976 | Kingsford |
| 4,056,111 A | 11/1977 | Mantelet |
| 4,089,079 A | 5/1978 | Nicholson |
| 4,186,733 A | 2/1980 | Mogaki |
| 4,302,901 A | 12/1981 | Psyras |
| 4,370,771 A | 2/1983 | Gonzalvo |
| 4,397,326 A | 8/1983 | Formica |
| 4,428,338 A | 1/1984 | Skatsche |
| D272,952 S | 3/1984 | Holloway |
| 4,490,877 A | 1/1985 | Drumm |
| 4,498,490 A | 2/1985 | Seidler |
| 4,632,136 A | 12/1986 | Kingsford |

(Continued)

FOREIGN PATENT DOCUMENTS

| CH | 585047 | 2/1977 |
|---|---|---|
| CH | 609238 | 2/1979 |
| DE | 3833358 C2 | 1/1996 |

(Continued)

*Primary Examiner* — Todd Manahan
*Assistant Examiner* — Brianne O'Neill
(74) *Attorney, Agent, or Firm* — Megan C. Hymore; John G. Powell

(57) ABSTRACT

An applicator includes a handle and an applicator head coupled to the handle. The applicator head includes at least one helical applicator surface, the at least one helical applicator surface disposed about a hollow space, and a plurality of projections attached only to a section of the at least one helical applicator surface facing the hollow space. The plurality of projections depend into the hollow space.

25 Claims, 16 Drawing Sheets

U.S. PATENT DOCUMENTS

| | | | |
|---|---|---|---|
| 4,679,271 A | 7/1987 | Field |
| 4,687,364 A | 8/1987 | Kingsford |
| 4,691,720 A | 9/1987 | Schmitz |
| 4,698,869 A | 10/1987 | Mierau |
| 4,744,377 A | 5/1988 | Dolan, Jr. |
| 4,766,432 A | 8/1988 | Field |
| D304,095 S | 10/1989 | Gavin |
| D306,967 S | 4/1990 | Matsuura |
| 4,914,988 A | 4/1990 | Chang |
| 4,922,934 A | 5/1990 | Gatti |
| 4,974,980 A | 12/1990 | Gueret |
| 4,988,502 A | 1/1991 | Ounanian |
| 5,007,442 A | 4/1991 | Hirzel |
| 5,061,103 A | 10/1991 | Walsh-Smith |
| 5,078,157 A | 1/1992 | Golan |
| 5,086,793 A | 2/1992 | Kingsford |
| 5,172,992 A | 12/1992 | Ackermann |
| 5,186,728 A | 2/1993 | Fong |
| 5,253,382 A | 10/1993 | Beny |
| 5,343,881 A | 9/1994 | Golan |
| 5,372,444 A | 12/1994 | Lhuisset |
| 5,383,242 A | 1/1995 | Bigler |
| 5,407,093 A | 4/1995 | McGill |
| D358,294 S | 5/1995 | Letica |
| 5,435,034 A | 7/1995 | Bigler |
| 5,492,136 A | 2/1996 | Edmonds |
| 5,575,579 A | 11/1996 | Joulia |
| D383,980 S | 9/1997 | Abfier |
| 5,784,742 A | 7/1998 | Giuliani |
| 5,794,296 A | 8/1998 | Wong |
| 5,816,728 A | 10/1998 | Nardolillo |
| 5,822,821 A | 10/1998 | Sham |
| 5,853,010 A | 12/1998 | Suh |
| D408,283 S | 4/1999 | Tucker |
| D409,800 S | 5/1999 | Litton |
| 5,937,871 A | 8/1999 | Clay |
| 5,956,791 A | 9/1999 | Bassi |
| D420,767 S | 2/2000 | Coates |
| D424,937 S | 5/2000 | Tucker |
| 6,142,692 A | 11/2000 | Garcia |
| 6,145,514 A | 11/2000 | Clay |
| 6,199,242 B1 * | 3/2001 | Masterman et al. ......... 15/167.1 |
| 6,295,994 B1 | 10/2001 | Thayer et al. |
| 6,345,626 B1 | 2/2002 | Bouix |
| RE37,605 E | 3/2002 | Clay |
| 6,412,496 B1 | 7/2002 | Gueret |
| 6,450,178 B1 | 9/2002 | Clay |
| 6,454,674 B1 | 9/2002 | Krzesicki et al. |
| 6,565,276 B1 * | 5/2003 | Diaz ............................ 401/129 |
| 6,616,366 B1 | 9/2003 | Weihrauch |
| 6,652,888 B2 | 11/2003 | Rhoades |
| 6,662,810 B2 * | 12/2003 | Gueret ......................... 132/218 |
| 6,691,716 B2 | 2/2004 | Neuner et al. |
| 6,811,340 B2 | 11/2004 | Petit |
| 6,948,780 B1 | 9/2005 | Litman et al. |
| 7,025,068 B2 | 4/2006 | Dumler |
| 7,069,936 B2 * | 7/2006 | Gueret ......................... 132/218 |
| 7,089,946 B2 * | 8/2006 | Rousselet ..................... 132/218 |
| D530,857 S | 10/2006 | Black |
| 7,165,906 B2 | 1/2007 | Diedonet |
| D548,973 S | 8/2007 | Dawson |
| D550,078 S | 9/2007 | Henry |
| 7,490,616 B2 * | 2/2009 | Gueret ......................... 132/218 |
| 2001/0018061 A1 | 8/2001 | Rhoades |
| 2001/0046506 A1 | 11/2001 | Rhoades |
| 2001/0050089 A1 | 12/2001 | Fitjer |
| 2002/0069726 A1 | 6/2002 | Adler |
| 2003/0165550 A1 | 9/2003 | Rhoades |
| 2004/0195063 A1 | 10/2004 | Simonis |
| 2004/0234323 A1 | 11/2004 | Albisetti |
| 2004/0244809 A1 | 12/2004 | Gueret |
| 2005/0086752 A1 | 4/2005 | Lee |
| 2005/0142093 A1 | 6/2005 | Skover |
| 2005/0217691 A1 * | 10/2005 | Petit ............................ 132/320 |
| 2005/0250076 A1 | 11/2005 | Rhoades |
| 2005/0268409 A1 | 12/2005 | Blaustein |
| 2006/0032512 A1 | 2/2006 | Kress |
| 2006/0042647 A1 | 3/2006 | Vogel |
| 2006/0051155 A1 | 3/2006 | Delage |
| 2006/0076033 A1 | 4/2006 | Bouix |
| 2006/0228157 A1 | 10/2006 | Dieudonat |
| 2006/0272666 A1 | 12/2006 | Wyatt et al. |
| 2006/0272667 A1 | 12/2006 | Wyatt |
| 2006/0272668 A1 | 12/2006 | Wyatt |
| 2007/0186948 A1 | 8/2007 | Kim |
| 2007/0231050 A1 | 10/2007 | Thiebaut |
| 2007/0261868 A1 | 11/2007 | Gross |
| 2007/0272269 A1 | 11/2007 | Wyatt et al. |
| 2007/0289602 A1 | 12/2007 | Simmons |
| 2008/0011316 A1 | 1/2008 | Malvar |
| 2008/0087296 A1 | 4/2008 | Gueret |
| 2008/0196735 A1 | 8/2008 | Wyatt |
| 2008/0196736 A1 | 8/2008 | Wyatt |
| 2008/0236607 A1 | 10/2008 | Lee |
| 2009/0025746 A1 | 1/2009 | Kim |
| 2009/0071499 A1 | 3/2009 | Wyatt |
| 2009/0071500 A1 | 3/2009 | Wyatt |
| 2009/0154985 A1 | 6/2009 | Wyatt |
| 2009/0226238 A1 | 9/2009 | Lane |
| 2010/0000566 A1 | 1/2010 | Wyatt |
| 2010/0089414 A1 | 4/2010 | Wyatt |
| 2010/0269846 A1 | 10/2010 | Wyatt |

FOREIGN PATENT DOCUMENTS

| | | |
|---|---|---|
| DE | 20210482 | 10/2002 |
| DE | 19950665 | 7/2003 |
| EP | 0289726 B1 | 8/1992 |
| EP | 0371501 B1 | 8/1997 |
| EP | 0845305 B1 | 10/2002 |
| EP | 0848920 B1 | 3/2003 |
| EP | 1621104 A | 5/2006 |
| FR | 1565296 | 4/1969 |
| FR | 2345964 A | 10/1977 |
| FR | 2701197 A | 3/1995 |
| FR | 200216283 | 6/2004 |
| GB | 846639 A | 8/1960 |
| GB | 1502532 A | 3/1978 |
| GB | 2132884 | 7/1984 |
| GB | 2304645 | 3/1997 |
| GB | 2284750 A | 10/1997 |
| JP | 5329024 | 12/1993 |
| JP | 8289815 | 11/1996 |
| JP | 1996289815 A | 11/1996 |
| JP | 2005095531 A | 4/2005 |
| JP | 04040905 B2 | 1/2008 |
| KR | 200326065 | 8/2003 |
| KR | 2020030012684 | 8/2003 |
| KR | 200334143 | 11/2003 |
| KR | 2020030025327 | 11/2003 |
| KR | 200341762 | 2/2004 |
| KR | 2020030030514 | 2/2004 |
| KR | 200356837 | 7/2004 |
| KR | 2020040011077 | 7/2004 |
| KR | 200358513 | 8/2004 |
| KR | 2020040010980 | 8/2004 |
| KR | 200393379 | 8/2005 |
| KR | 2020050016644 | 8/2005 |
| KR | 200396785 | 9/2005 |
| KR | 2020050016643 | 9/2005 |
| KR | 200404002 | 12/2005 |
| KR | 2020050028145 | 12/2005 |
| KR | 200416525 | 5/2006 |
| KR | 200416536 | 5/2006 |
| KR | 2020060004384 | 5/2006 |
| WO | WO9403125 | 2/1994 |
| WO | WO9700650 A1 | 1/1997 |
| WO | WO-00/54623 A1 | 9/2000 |
| WO | WO-2004/077987 A1 | 9/2004 |
| WO | WO2006130643 A | 5/2006 |
| WO | WO2006090343 A1 | 8/2006 |
| WO | WO2006130644 A2 | 12/2006 |
| WO | WO2006132459 A1 | 12/2006 |
| WO | WO2007094552 A1 | 8/2007 |
| WO | WO2007060438 A3 | 9/2007 |
| WO | WO2008051067 A2 | 5/2008 |

* cited by examiner

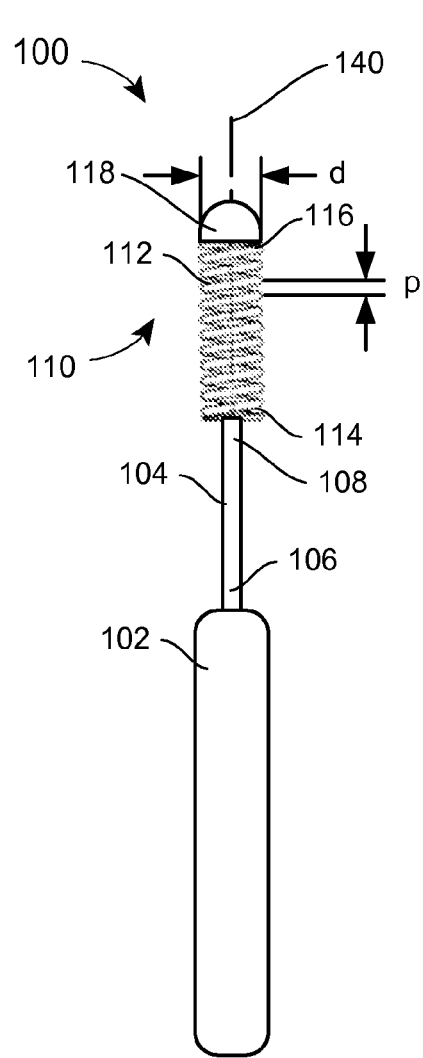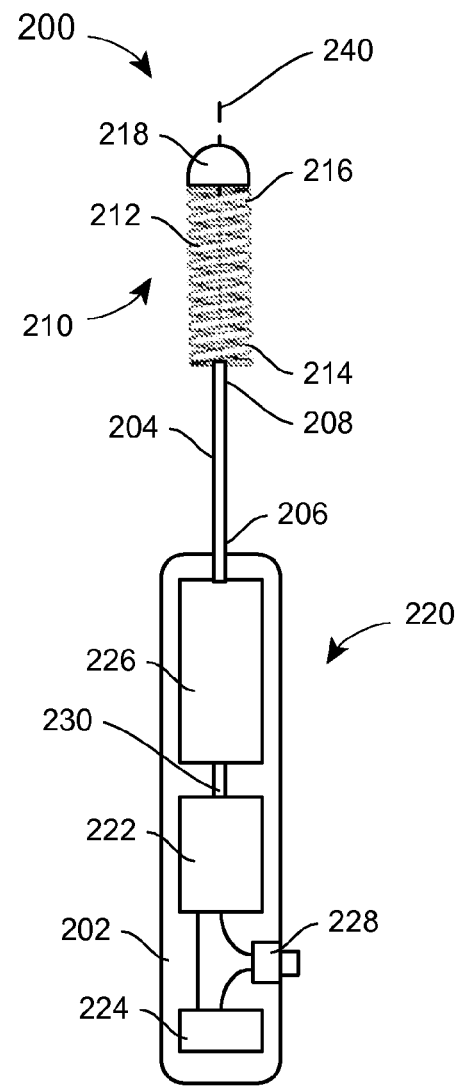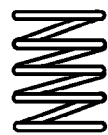
FIG. 1                    FIG. 2
FIG. 1A

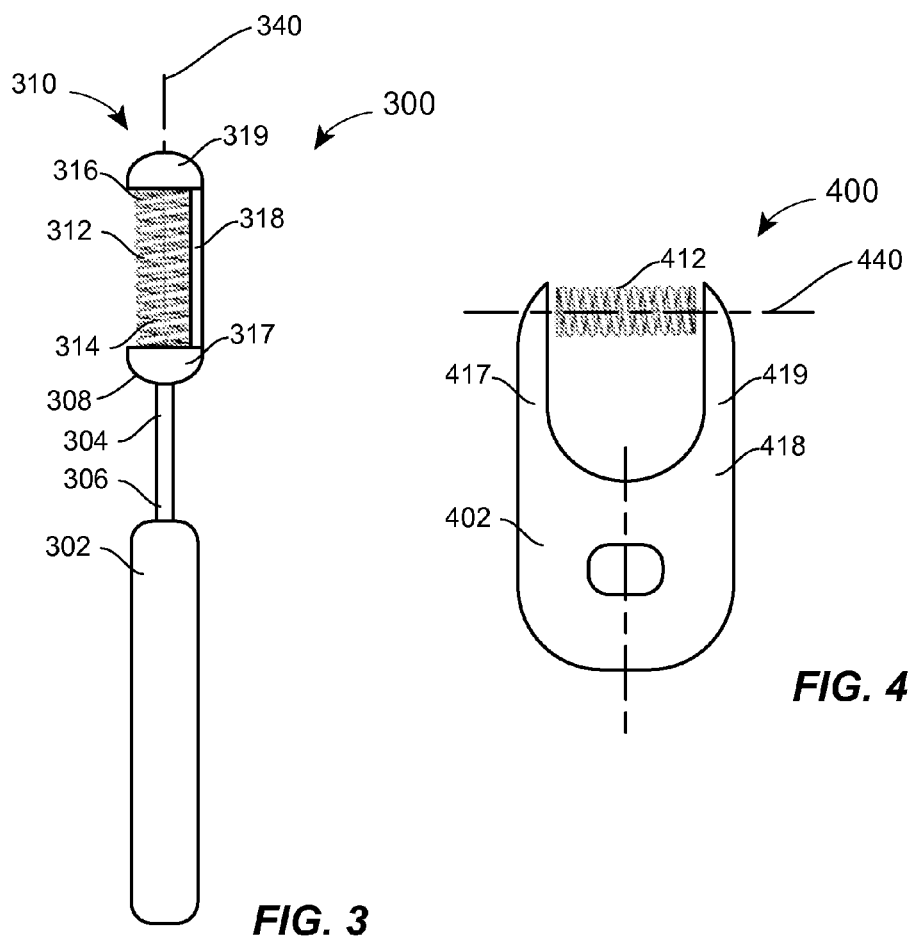
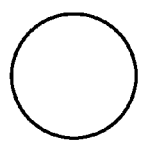
FIG. 3
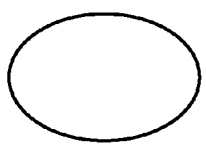
FIG. 4
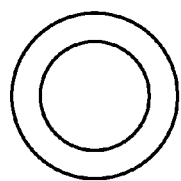
FIG. 5A
FIG. 5B
FIG. 5C
FIG. 5D
FIG. 5E

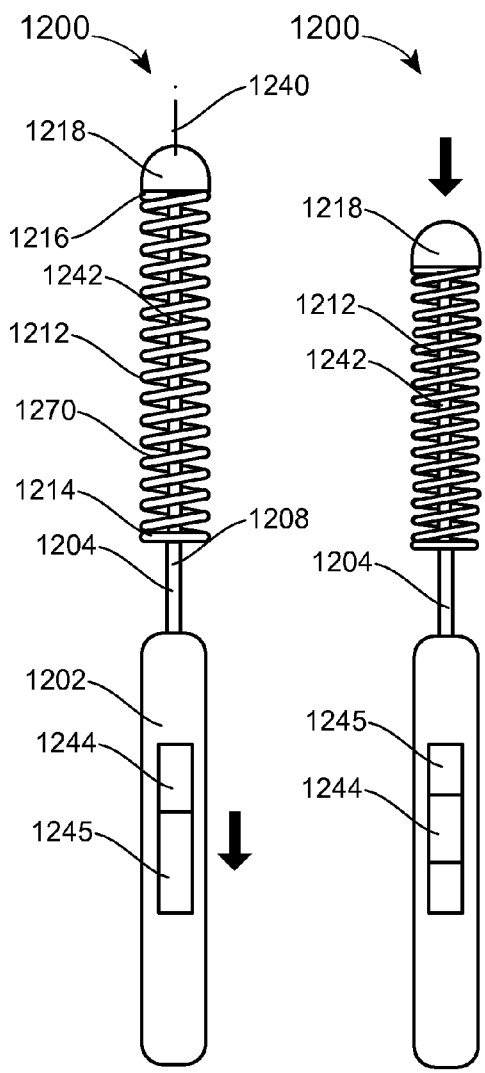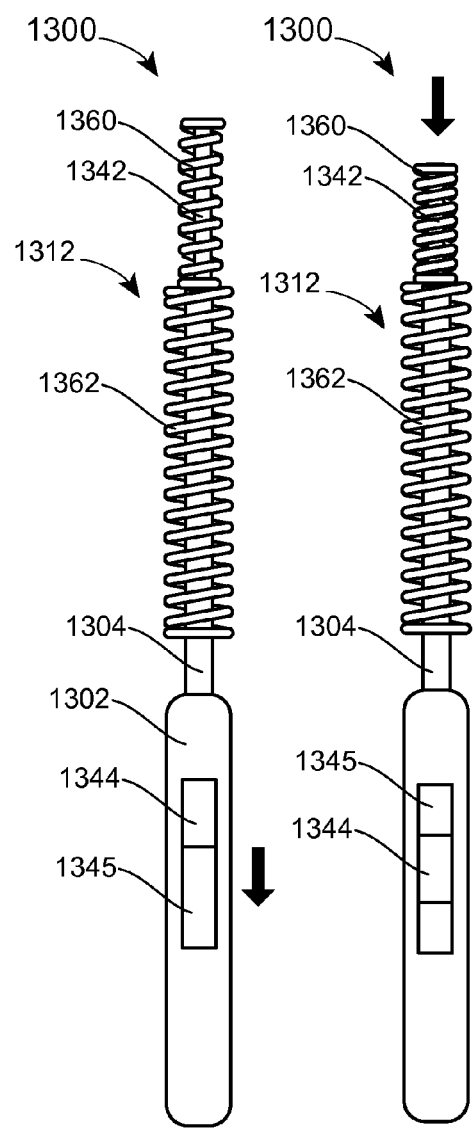
*FIG. 12A*  *FIG. 12B*  *FIG. 13A*  *FIG. 13B*

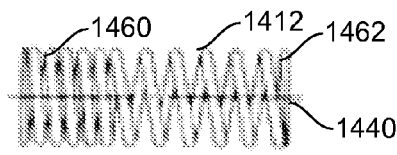
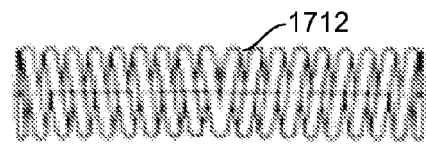
FIG. 14   FIG. 17
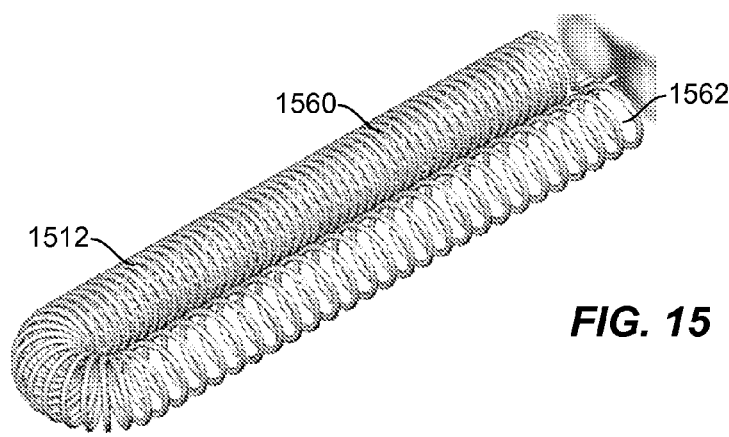
FIG. 15
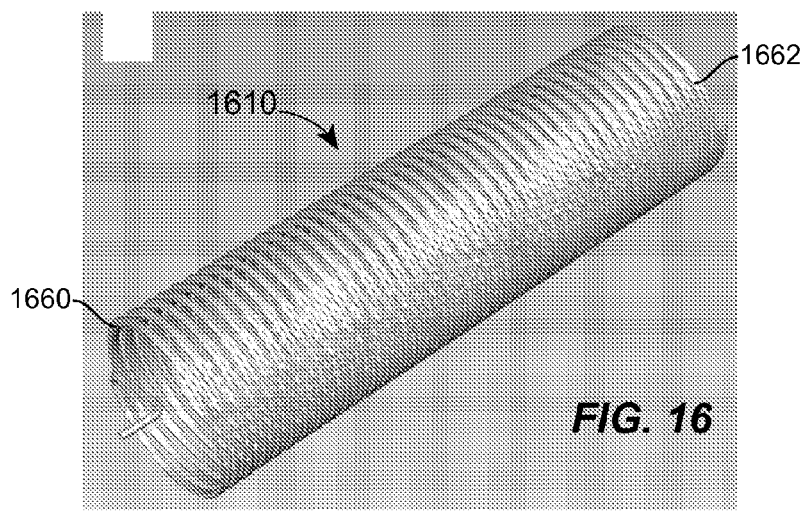
FIG. 16

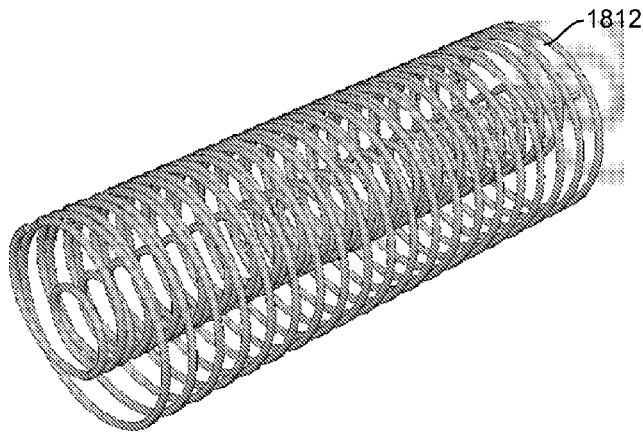 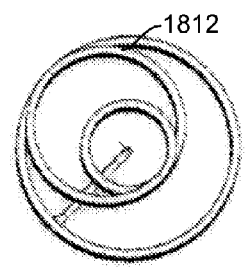
*FIG. 18A*  *FIG. 18B*
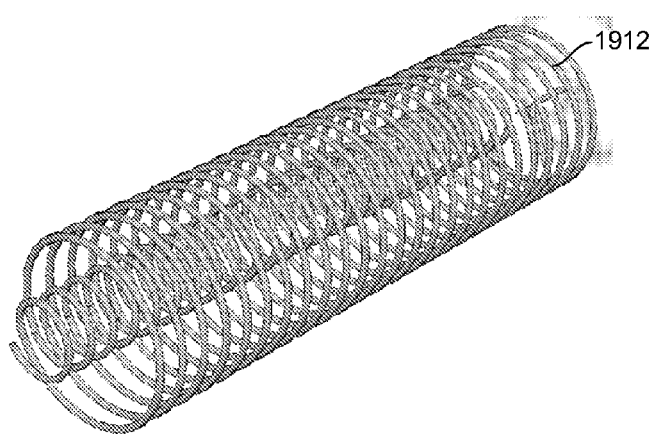 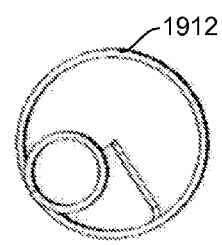
*FIG. 19A*  *FIG. 19B*

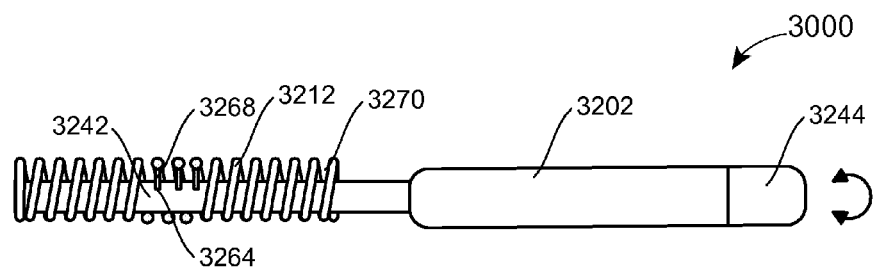
FIG. 32A
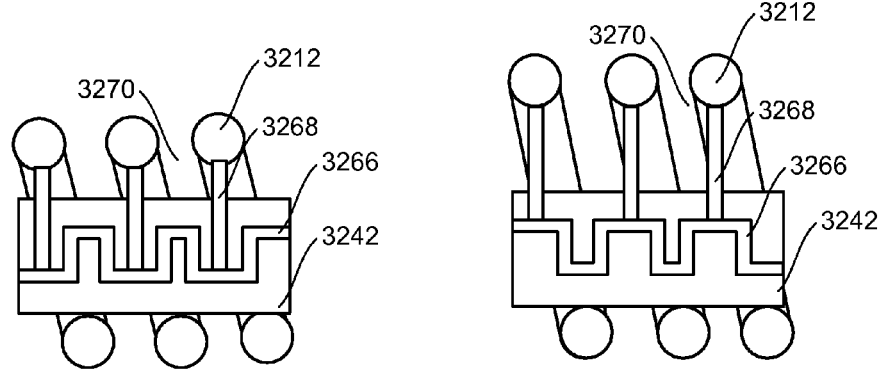
FIG. 32B  FIG. 32C
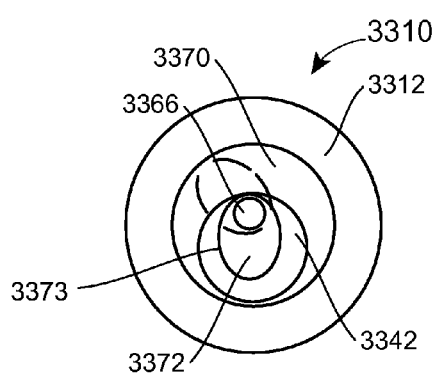  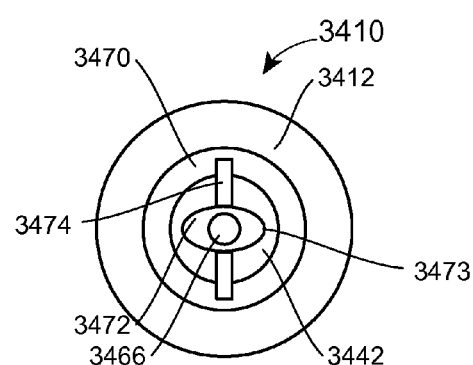
FIG. 33  FIG. 34

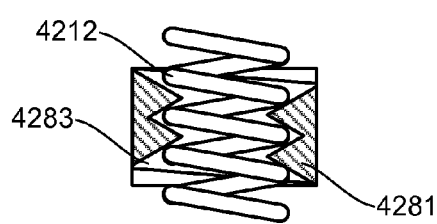
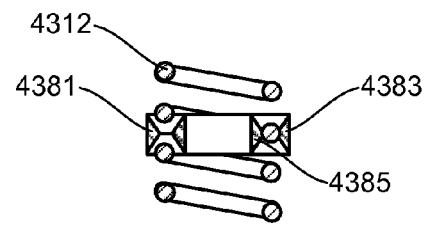
FIG. 42  FIG. 43
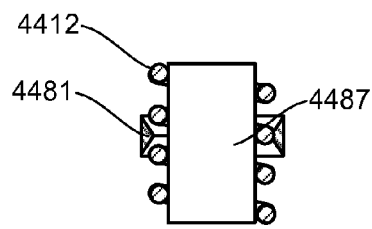
FIG. 44
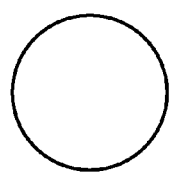 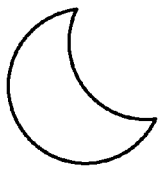 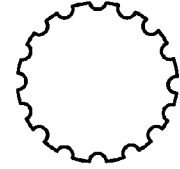
FIG. 45A  FIG. 45B  FIG. 45C
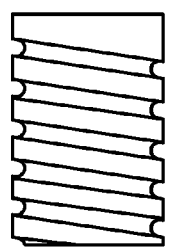 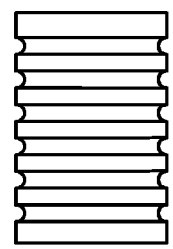
FIG. 45D  FIG. 45E

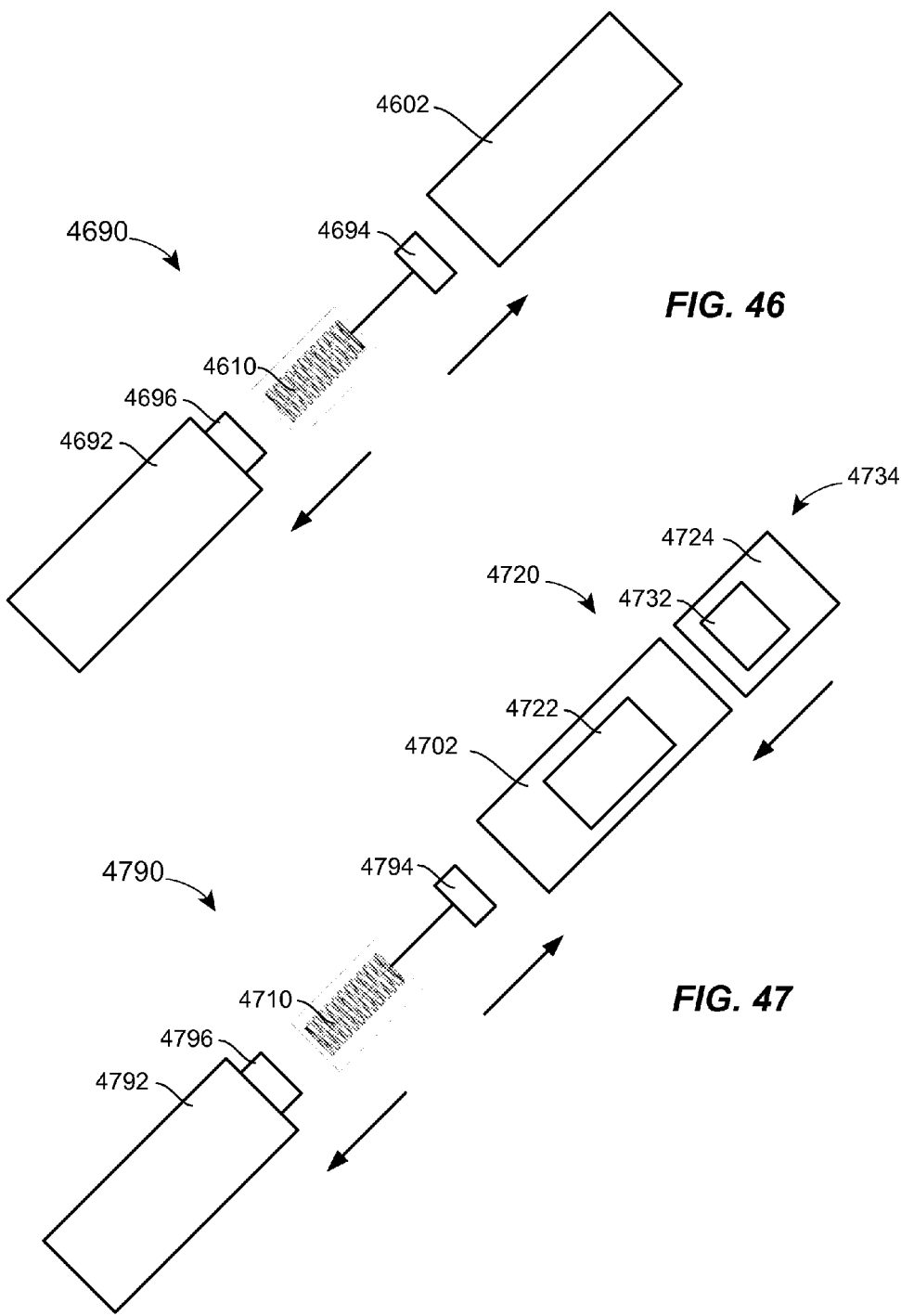

APPLICATOR WITH HELICAL APPLICATOR SURFACE

FIELD OF THE INVENTION

The present disclosure is directed to an applicator with a helical applicator surface, such as a cosmetic applicator with a helical applicator surface for use in applying cosmetic product.

BACKGROUND OF THE INVENTION

Various types of applicators are known in the art. Brushes or wands for applying product, such as mascara or a hair color product, to a target material, such as keratinous fibers like eyelashes and head hair, generally include an applicator head with a stem having a first end attached to a handle. The applicator head also includes one or more applicator elements coupled to the stem. The applicator elements may be in the form of bristles (such as in a twisted wire brush), molded fibers, molded surfaces, etc. In use, the applicator elements are loaded with product and applied to the target material, with the product being transferred from the outside of the applicator element to the target material.

Moreover, conventional applicators typically require manipulation of the handle or other member, and often require repeated passes of the applicator across the target material, such as the eyelashes, to completely and uniformly coat each eyelash with product while maintaining or promoting separation of the eyelashes from one another. To coat the entire eyelash, for example, a user may move the brush in a vertical direction to ensure that the entire eyelash is covered. In addition, a user may rotate the brush to place different portions of the brush head in contact with the eyelash, depending on the desired amount of mascara to be applied to the eyelashes. Still further, a user may also reciprocate the brush in a horizontal direction to promote separation of the eyelashes and/or to ensure better coverage of the eyelashes.

Accordingly, it may be desirable to provide a system or an article that improves the transfer of product from the applicator to the target material, such as mascara or hair color product from the applicator surface to the eyelashes or head hair. For example, it may be desirable to provide a system or an article that provides a thick, even application of product to a target material. Likewise, it may be desirable to provide a system or article that minimizes undesirable effects on the target material. For example, it may be desirable to provide a system or an article that minimizes clumping of adjacent eyelashes. As another example, it may be desirable to provide a system or an article that transfers the product in a precise and directed fashion. Simply, it may be desirable to provide a system or an article that facilitates the efforts of the user while overcoming one or more of the drawbacks of conventional technology.

SUMMARY OF THE INVENTION

According to an aspect of the present disclosure, an applicator includes a handle and an applicator head coupled to the handle. The applicator head includes at least one helical applicator surface, the at least one helical applicator surface disposed about a hollow space, and a plurality of projections attached only to a section of the at least one helical applicator surface facing the hollow space. The plurality of projections depend into the hollow space.

According to another aspect of the present disclosure, an applicator includes a handle and an applicator head coupled to the handle. The applicator head includes at least one helical applicator surface, the at least one helical applicator surface disposed about a hollow space, and a plurality of projections attached only to a section of the at least one helical applicator surface facing the hollow space. The plurality of projections have a first end attached to the at least one helical applicator surface and a second end depending into the hollow space.

According to yet another aspect of the present disclosure, an applicator includes a handle and an applicator head coupled to the handle. The applicator head includes at least one helical applicator surface, the at least one helical applicator surface disposed about a hollow space, and a plurality of projections attached to a section of the at least one helical applicator surface. The plurality of projections are attached integrally and continuously to a section of the applicator surface, such that the profile of the head in a first section has a first cross-sectional area and the profile of the head in a second section has a second cross-sectional area.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

FIG. 1 is a plan view of a cosmetic applicator according to the present disclosure;

FIG. 1A is a plan view of an alternate surface for the applicator of FIG. 1;

FIG. 2 is a plan view of an automated cosmetic applicator according to the present disclosure;

FIG. 3 is a plan view of another cosmetic applicator according to the present disclosure, which applicator may or may not be automated, with the surface supported at both ends;

FIG. 4 is a plan view of still another cosmetic applicator according to the present disclosure, which applicator may or may not be automated, with the surface supported at both ends;

FIGS. 5A-H are cross-sections of applicator surface profiles;

FIG. 12A is a partial, enlarged view of an applicator with an adjustment mechanism for adjusting the pitch of a surface, with the surface having a first pitch;

FIG. 12B is a partial, enlarged view of the applicator of FIG. 12A, with the surface having a second pitch that is smaller than the first pitch;

FIG. 13A is a partial, enlarged view of an applicator with another adjustment mechanism for adjusting the pitch of a surface, with the surface having a first pitch;

FIG. 13B is a partial, enlarged view of the applicator of FIG. 13A, with the surface having a second pitch that is smaller than the first pitch;

FIG. 14 is an enlarged plan view of an applicator surface in the form of a coil with varying pitch;

FIG. 15 is a perspective view of an applicator surface in the form of a coil with varying pitch, with first and second sections of the surface having separate axes;

FIG. 16 is a perspective view of another applicator surface in the form of a coil with varying pitch;

FIG. 17 is a plan view of an applicator surface in the form of a coil having sections of varying handedness;

FIG. 18A is a perspective view of an applicator surface with multiple axes of rotation, at least one of the axes being concentric;

FIG. 18B is an end view of the applicator surface of FIG. 18A;

FIG. 19A is a perspective view of an applicator surface with multiple axes of rotation, the axes being offset;

FIG. 19B is an end view of the applicator surface of FIG. 19A;

FIG. 32A is a plan view of still another adjustment mechanism for varying the characteristics of an applicator surface in a first, relaxed state, with a section removed to expose the adjustment mechanism;

FIG. 32B is an partial, enlarged, cross-sectional view of the adjustment mechanism and surface of FIG. 32A with the surface in the first, relaxed state;

FIG. 32C is an partial, enlarged, cross-sectional view of the adjustment mechanism of FIG. 32A with the surface in a second, altered state;

FIG. 33 is an partial, enlarged, cross-sectional view of an additional adjustment mechanism for varying the characteristics of an applicator surface, with the surface in a first, relaxed state;

FIG. 34 is an partial, enlarged, cross-sectional view of still another adjustment mechanism for varying the characteristics of an applicator surface, with the surface in a first, relaxed state;

FIG. 42 is a partial, cross-sectional view of a wiper according to the present disclosure with a portion of an applicator head disposed therein;

FIG. 43 is a partial, cross-sectional view of a wiper according to the present disclosure with a portion of an applicator head disposed therein and illustrated in cross-section as well;

FIG. 44 is a partial, cross-sectional view of a wiper and core arrangement according to the present disclosure;

FIGS. 45A-C are end views of alternative embodiments of the core of FIG. 44;

FIGS. 45D-E are plan views of alternative embodiments of the core of FIG. 44;

FIG. 46 is an exploded view of an cosmetic applicator in combination with a holder; and FIG. 47 is an exploded view of an automated cosmetic applicator in combination with a holder.

DETAILED DESCRIPTION OF THE INVENTION

Figure 5F:
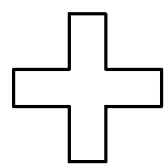

The present disclosure details a variety of cosmetic applicators having helical applicator heads and systems incorporating such applicators. FIGS. 1-4 introduce variants of the applicator generally, while FIGS. 5-36 illustrate various alternative embodiments of the helical applicator surfaces. FIGS. 37-45 illustrate various embodiments of an applicator with a helical applicator surface in combination with a source of cosmetic product and wipers to be used with the applicator. FIGS. 46 and 47 illustrate the applicators similar to those of FIGS. 1 and 2 in combination with a bottle or a holder. Throughout, a numbering convention has been adopted such that similar features of the various embodiments have been numbered in a similar manner.

Regardless of the embodiment, it is believed that use of a helical applicator surface may have one or more advantages over conventional applicator heads. It is believed that in certain circumstances the helical applicator head may subject lashes to a "pull" force, rather than a "push" force, while using the same application motion as is used with conventional applicator heads. Additionally, the helical applicator may permit the target materials to come into contact with the product on the inner side of the applicator surface, or on the inner side and the outer side of the applicator surface. Thus, it is believed that the movement of the lashes through the applicator head may expose more surface area of the applicator surface to the lash on different planes in a single application motion than with a conventional applicator head. It is believed that the rounded edge of the helical applicator may be perceived as (and may be) a safer applicator surface than bristles, tines or certain types of protrusions. In this regard, it may be possible to operate the helical applicator head at higher speeds or intensities than may be possible with conventional applicator heads.

DEFINITIONS

The term "cosmetic applicator" or "applicator" may refer to an apparatus, device or system used to apply cosmetic product, such as mascara, to a keratinous material, such as eyelashes. However, applicator may more generally refer to an apparatus, device or system used to apply a product to a target material, such as a personal care product to a keratinous material such as hair.

The term "applicator surface" may refer to a structure from which a product, like a cosmetic product such as mascara, is transferred to a target material, like a keratinous material, such as eyelashes.

The term "applicator head" may refer to one or more applicator surfaces, in whole or in part, and may also refer to a structure that supports the applicator surface(s).

The term "attached" may refer to elements being connected or united by adhering, fastening, bonding, embedding, molding, etc. by any method suitable for the elements being joined together. Attachment may also include pressure or friction fits. Many suitable methods for attaching elements together are well-known, including adhesive bonding, mechanical fastening, etc. Such attachment methods may be used to attach elements together over a particular area either continuously or intermittently.

The term "chromatic color" refers to a color having a lightness value of greater than about 10; a chroma value of greater than about (22–0.22 L), wherein L is the lightness; and a hue value of from about 0 to about 360.

The term "chroma value" ("$C^{ab}$" or "$C$") refers to the vector distance from the center of the color space to the measured color; it is intended to designate saturation or intensity of a color and distinguishes color intensity from clarity (i.e. vividness vs. dullness). The lower the chroma of the color, i.e. the less its intensity, the closer the color is to being a grey color.

The term "contrasting color" refers to a non-chromatic color compared to a chromatic color; "contrasting color" may also refer to least two chromatic colors having a hue difference of greater than 45 degrees, specifically greater than 75 degrees, more specifically greater than 90 degrees; "contrasting color" may also refer to a chromatic color or a non-chromatic color compared to a transparent or translucent object; "contrasting color" may refer to where the delta L is greater than 3 or the delta C is greater than 5.

The term "coupled" refers to configurations whereby an element is directly secured to another element by attaching the element directly to the other element, and to configurations whereby an element is indirectly secured to another element by attaching the element to intermediate member(s) that is(are) in turn attached to the other element.

The term "disposed" is used to mean that an element(s) exists in a particular place or position as a unitary structure with other elements or as a separate element coupled to other elements.

The term "drive" refers to an apparatus, device or system that moves a driven element, such as an applicator head or applicator surface, that is coupled to the drive. The drive may include a motor and a source of power for the motor.

The term "effective diameter" refers a measurement related to a cross-section. In regard to a circular cross-section, the effective diameter is the diameter of the cross-section. For non-circular cross-sections, the effective diameter may be more difficult to describe. However, one manner in which the effective diameter may be calculated is as four times the area of the cross-section divided by the perimeter of the cross-section.

The term "effective pitch" or "pitch" refers to the distance across a space between adjacent points of a helical surface. Where the helical surface is a single helix with a single axis, the pitch may be described as the distance between facing surfaces of adjacent portions, or revolutions, of the surface. Alternatively, where the helical surface has multiple helices or multiple axes, the pitch may refer to the distance between facing surfaces of adjacent revolutions of different helices or adjacent revolutions of the same helix about different axes.

The term "hue value" ("$h^{ab}$" or "$h$") refers to the basic colors, such as red, yellow or blue. Hue is defined in a plane with red, yellow, green, and blue being 90 degrees apart from one another. A color's hue is an angle in that plane.

The term "LCh color space" is a color measurement convention wherein the L value, C value and h value may be plotted in a three dimensional space using polar components where L is an axis, h is an angle, and C is the distance away from the L axis along the h angle, as defined in the CIE L*C$^{ab}$*h$^{ab}$ color space system. Measurements may be taken, by way of example and not by way of limitation, using A, D50, D55, D65, F2, F7, F11, or TL84 as the illuminant with either a 2-degree or 10-degree observer. Potential measurement devices include, but should not be limited to, an Ocean Optics' USB4000 fiber optic spectrophotometer or a Datacolor Microflash integrating sphere spectrophotometer.

The term "lightness value" ("L*" or "L") refers to the perception of light to dark of the color. Black has low lightness (theoretically approaching 0) and white has high lightness.

The term "matching color" refers to least two chromatic or non-chromatic colors having a hue difference of less than 40 degrees, specifically less than 30 degrees, more specifically less than 20 degrees.

The term "non-chromatic color" refers to a color having a lightness value of less than about 10; "non-chromatic color" may also refer to a coloring having a lightness value of greater than about 10 and a chroma value of less than about (22−0.22 L), wherein L is the lightness.

These terms may be defined with additional language in the remaining portions of the specification.

Cosmetic Applicator

As illustrated in FIG. 1, a cosmetic applicator 100 according to the present disclosure may include a handle 102 and a stem 104 having a first end 106 attached to the handle 102 and a second end 108. The applicator 100 may also include an applicator head 110 that defines an applicator surface 112, which may be as illustrated in FIG. 1 or in FIG. 1A. The surface 112 may be attached to the second end 108 of the stem 104, such that the first end 114 of the applicator surface 112 is coupled thereby to the handle 102 and the second end 116 of the applicator surface 112 is free. The second end 116 may terminate in a cap 118, which cap 118 may be integral with the applicator surface 112 or may be otherwise attached thereto. The cap 118 may have various functions, including as a surface that cooperates with wiping surfaces to remove product from the end of the surface 112 to prevent formation of a product "tail." While a hemispherical shape is illustrated for the cap 118 in FIG. 1, the shape may vary.

As shown in FIG. 1, the applicator surface 112 is held in a spatial relationship to the handle 102 wherein the surface 112 has no or limited relative motion. However, the applicator according to the present disclosure is not so limited.

As illustrated in FIG. 2, an automated cosmetic applicator 200 according to the present disclosure may also include a handle 202 and a stem 204 having a first end 206 coupled to the handle 202 and a second end 208. The applicator 200 may include an applicator head 210 and an applicator surface 212. Similar to the surface 112, the surface 212 may be attached to the second end 208 of the stem 204, such that the first end 214 of the applicator surface 212 is coupled thereby to the handle 202 and the second end 216 of the applicator surface 212 is free. A cap 218 is attached to the second end 216 of the applicator surface 212.

Unlike the applicator 100, the applicator 200 also includes a drive 220. In all or only in certain operative states, the drive 220 may move the applicator head 210, in whole or in part, relative to the handle 202.

That is, in certain operative states, the drive 220 may be disengaged and/or decoupled from the applicator head 210 such that the applicator head 210 has no or limited relative motion relative to the handle 202, while in other states the drive 220 may be engaged and/or coupled to the head 210 to move the head 210 relative to the handle 202. Alternatively, the drive 220 and/or the head 210 may be secured against motion in certain operative states. In regard to such alternative embodiments, the drive 220 or head 210 may be engaged, in whole or in part, by an element, such as a switch, that couples the drive 220 or the head 210 fixedly to the handle 202, such that no or only limited relative motion may occur between the head 210 and the handle 202.

The relative motion of the head 210 may take various forms. According to certain embodiments, the head 210 may, in whole or in part, rotate about an axis relative to the handle 202. The axis of rotation of the head 210 may or may not correspond to the one or more axes of the surface 212, the multiple axis surface 212 being explained in greater detail below. According to other embodiments, the head 210 may, in whole or in part, translate along an axis relative to the handle 202. According to still other embodiments, the head 210 may, in whole or in part, vibrate. It will be recognized that the drive 220 may move the head 210 according to any combination of rotational, translational, and vibrational motion relative to the handle 202, and this motion may occur at any one or all of a fixed speed, frequency, amplitude and time duration or any one or all of the speed, frequency, amplitude and time duration may vary. See, for example, U.S. patent application Ser. No. 11/143,176.

As to the components of the drive 220, it will be recognized that, as illustrated, the drive 220 may include an actuator 222, a power source 224, and a transmission 226. The transmission 226 couples the actuator 222 to the stem 204, and in doing so, couples the drive 220 to the applicator head 210 and, thus, the applicator surface 212. However, the transmission 226 is optional, and may be omitted according to certain embodiments of the applicator 200.

The structure and operation of the actuator 222 may vary according to the desired motion to be achieved between the head 210 and the handle 202. According to certain embodiments, the actuator 222 may be in the form of a motor. The motor may be a mechanical motor with a source of potential mechanical energy in the form of a resilient member—a spring or rubber band, for example. Alternatively, as illustrated, the motor 222 may be an electric motor, in which case the drive 220 may also include a power source 224 in the form of a battery, for example, coupled to the motor 222 to provide the necessary voltage and current. Where the motor 222 is an electric motor, the voltage and current may even be provided by an power source external to the handle 202, such as an embodiment wherein to the motor 222 is coupled to the electric mains via an electrical outlet, for example.

According to certain embodiments, a drive circuit may be coupled to the motor 222 and the source 224 to control operation of the motor 222. The drive circuit may include a switch or control surface 228 to turn the motor 222 on and off, or couple and decouple the motor 222 to the source 224. The switch or control surface 228 may also or instead vary the mode of operation of the drive. For example, actuation of the switch or control surface 228 may change the direction of rotation of the motor 222.

As for the transmission 226, its structure and operation may also vary according to the desired motion to be achieved. In fact, the transmission 226 may transform, in whole or in part, the motion of the motor 222 prior to coupling to the applicator head 210. For example, rotational motion of the motor 222 (or more particularly, its shaft 230) may be transformed, at least in part, to translational motion. In addition or in the alternative, the transmission 226 may reduce the speed of the motor 222 to a rotational speed appropriate for the applicator head 210. As noted above, in certain embodiments, the transmission 226 may be omitted because the motor shaft 230 does not rotate faster than the desired rotational speed of the applicator head 210. In other embodiments, the transmission 226 may not be required because the motor 222 is capable of providing variable motions or speeds.

It will be further recognized that the drive 220 may include other elements, other than the actuator/motor 222, the power source 224 and the transmission 226. For example, the drive may include a torque limiter such that the torque applied via the applicator head does not exceed a predetermined allowable torque, to limit forces applied to or via the eyelashes. The torque limiter may be incorporated into the motor 222 or the transmission 226, be located between elements of the drive 220 (such as the motor 222 and the transmission 226) or be incorporated in or located between other elements of the applicator 200. See U.S. patent application Ser. No. 11/677, 326. Other additions to the drive 200 will be appreciated by those of skill in the art.

It will also be recognized that the applicators according to the present disclosure are not limited to only those illustrated in FIGS. 1 and 2. For example, FIG. 3 illustrates an applicator 300 wherein the surface 312 does not have a second end 316 that is free. Instead, both ends 314, 316 of the surface 312 of the applicator 300 illustrated in FIG. 3 are attached to a supporting structure 318. In particular, the surface 312 may be attached at a first end 314 and a second end 316 to a support 318 having a first end 317 and a second end 319, the first end 314 attached to the first end 317 of the support 318 and the second end 316 attached to the second end 319 of the support 318. Similar to the applicators 100, 200, the surface 312 of the applicator 300 has an axis 340 that is at a minimum parallel to a longitudinal of the handle 302. The applicator 300 may have a fixed axis 340, such as the applicator 100 in FIG. 1, or the applicator 300 may be automated so that the surface 312 is moveable about, along or relative to its axis 340.

However, still other embodiments are possible wherein the surface has a longitudinal axis parallel to, if not collinear with, a longitudinal axis of the handle, an applicator according to the present disclosure is not so limited. FIG. 4, for example, illustrates an applicator 400 similar to that of FIG. 3 wherein the head 412 is disposed between opposing arms 417, 419 of a yoke 418. However, unlike the support structure 318 of FIG. 3, the yoke 418 is oriented such that a longitudinal axis 440 of the applicator surface 412 is aligned substantially orthogonal to a longitudinal axis of a handle 402 of the applicator 400. It will also be recognized that while the longitudinal axis 440 and the longitudinal axis of the handle 402 are substantially orthogonal as illustrated, the angle between the two axes may vary. The applicator 400 may have a fixed axis 440, such as the applicator 100 in FIG. 1, or the applicator 400 may be automated so that the surface 412 is moveable about, along or relative to its axis 440.

Helical Applicator Head

In considering any of the applicators 100, 200, 300, 400 of FIGS. 1-4, it will be recognized that the applicators include a helical applicator head with a helical applicator surface. That is, the applicator surface may have a helical shape, appearing like a spring or coil in certain embodiments and like a screw in other embodiments. According to the illustrated embodiments, the applicator surface 100, 200, 300, 400 also has a hollow longitudinal axis 140, 240, 340, 440. The surface 112, 212, 312, 412 completes at least one revolution about this axis 140, 240, 340, 440.

It will also be recognized that a large number of variants are possible for the applicator head and applicator surface. An attempt has been made to discuss exemplary embodiments of the variants as possible. Many of these exemplary embodiments represent broader classes of variants, which classes may be combined with other embodiments and other classes discussed herein. To this end, the fact that a particular variation is discussed in the context of a particular embodiment is not intended to limit the variation to only the embodiment discussed, but rather the variations may be combined with those discussed in the context of other embodiments disclosed herein.

One manner in which the applicator head and applicator surface may vary is as to the cross-sectional profile of the element that forms the head and defines the surface. It may be recognized that the range of values for the effective diameter of the cross-sectional profile may vary according to the intended target material with which the applicator may be used. Thus, according to embodiments of the present disclosure, the cross-sectional profile of an applicator surface may have an effective diameter that varies between about 0.1 mm and about 5.0 mm, with embodiments at the upper end being for use with head hair for example. For certain embodiments wherein the target material is eyelashes, the cross-sectional profile may have an effective diameter that varies between about 0.1 mm and about 3.5 mm, or even about 2.0 mm. In fact, according to certain embodiments, the effective diameter may vary from about 0.15 mm to about 0.8 mm.

A variety of such cross-sectional profiles are illustrated in FIGS. 5A-E. The profiles of FIGS. 5A-E may be categorized in a number of different fashions, none of which exclude other possible categorizations. For example, certain of the profiles are circular, while others are non-circular. Certain of the embodiments are solid, while others are hollow. Even those embodiments that are hollow may be grouped into those that have a hollow interior space with a solid outer wall and those that have a hollow interior space but have one or more openings in the outer wall that permit access to the interior space. It will be recognized that these shapes could be combined to provide an even greater diversity of shapes, wherein for example a first section is defined by the shape of FIG. 5A while a second section is defined by the shape of FIG. 5B.

Figure 5G:
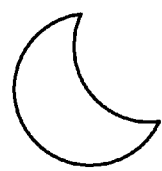
Figure 5H:
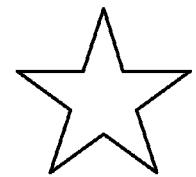

The profile illustrated in FIG. 5A is intended to have a circular or near circular shape. By contrast, the profiles of FIGS. 5B and 5C are non-circular. The profile of FIG. 5B is elliptical, although the degree of roundness or flatness may vary depending on the sizes of major and minor axes. The profile of FIG. 5C is a quadrilateral, and again the distances along the longer and shorter sides may vary between embodiments. Still other polygonal shapes may be used, such as triangles, pentagons, hexagons, etc. While the embodiments of FIGS. 5B and 5C have been shown with relatively regular ends, the ends of alternative embodiments may vary to a point, and thus have a sharp or knife's-edge appearance. Still other profiles are illustrated in FIGS. 5F-H, such as a cross (FIG. 5F), a crescent (FIG. 5G), or a star (FIG. 5H).

In contrast to the profiles illustrated in FIGS. 5A-C and 5F-H, which have a solid profile, the profiles of FIGS. 5D and 5E have hollow interior spaces. FIG. 5D illustrates a profile having an annular cross-section that is circular in general shape. It will be recognized, however, that either the outer surface or the inner surface of the cross-section of FIG. 5D could instead be another shape (e.g., elliptical). FIG. 5E illustrates a profile having a C-shaped cross-section. In this regard, the hollow interior space is in communication with the space external to the profile.

Other profiles are possible. For example, while the surfaces of the various embodiments illustrated have a uniform cross-sectional profile, it will be recognized that this is not a requirement of the present disclosure. For example, the surface could have a non-uniform cross-sectional profile that varies between one end and the opposite end. For example, the profile could be circular in places and elliptical in others. Moreover, the surface could have a profile that is not solid between opposite ends; gaps could be formed in the profile providing an irregular appearance that is either uniform (e.g., a zigzag pattern) or random.

Also, it will be recognized that a device or element may be disposed in to the hollow space defined in an embodiment such as FIG. 5D. For example, a heating element may be disposed in the hollow space, to increase the temperature of the applicator surface. Likewise, a coolant may be disposed in the hollow space to decrease the temperature of the applicator surface. One or more wires may be disposed in the hollow space, which wires may be used to vary the electric charge on the applicator surface, or provide magnetic fields of various strengths and/or polarities. In embodiments including more than one helical applicator surface, as is explained in greater detail below, the helical surfaces may be charged to have different polarities of electrical charge, which charge could be used to limit or guide the application of the product to the surface or its transfer from the surface.

Another way in which the heads and surfaces may vary is in regard to the diameter of the head or surface, whether in whole or in part, as opposed to the effective diameter of the cross-sectional profile of the surface. For example, in regard to the applicator surface 112 of FIG. 1, it will be noted a first distance, d, is marked out transverse to the longitudinal axis 140 of the surface 112. The distance d may be referred to herein as the effective diameter of the surface 112. Given that many of the surfaces described herein are coils, this may also be referred to as the effective coil diameter.

Again, it may be recognized that range of values for the effective diameter of the surface may vary according to the intended target material with which the applicator may be used. Consequently, the effective diameter may vary from about 2 mm to about 40 mm, with diameters at the upper end being for use with head hair for example. According to other embodiments of the present disclosure intended for use with eyelashes, the effective surface diameter may vary from about 2 mm to about 15 mm. According to certain embodiments, the effective surface diameter may vary from about 4 mm to about 9 mm.

In the case of mascara application to eyelashes, the surface diameter may vary over a large range of values. The surface diameter may be varied to address reasons including, but not limited to, lash physiology, desired degree of lash volumizing, and consumer perception of product benefit. For example, a small applicator may have advantages for use in corner areas around eye, while a large applicator can have more mascara product disposed on its surfaces, and therefor provide more product to transfer to a user's lashes. As to consumer perception, a consumer with small lashes for instance may not want to use a particularly large diameter applicator, and vice versa. In addition, the size and shape of an applicator can be viewed by the consumer as a metaphor for the applicator's benefit. A long helical surface may communicate length benefits, a wide helical surface may communicate volumizing benefits, and a helical surface with tight spacing between adjacent parts of surface may signal lash separation benefits. Different sized/shaped surfaces may work differently for different consumers.

Figure 6:
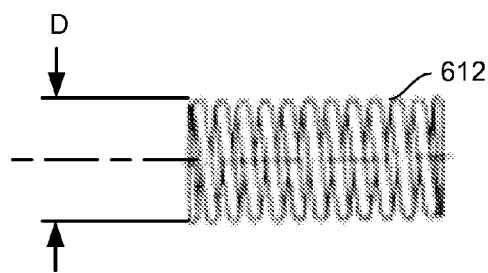
FIG. 6 is a plan view of an applicator surface in the form of a coil with a coil diameter that is larger than that illustrated in FIGS. 1 and 2.

As to the exemplary surfaces 112, 212, 312, 412 illustrated in FIGS. 1-4, it will be recognized that the surfaces 112, 212 have a uniform diameter. A coil at one end of the surfaces has the same diameter as a coil at the opposite end of the surfaces, as do substantially all of the coils between the opposite ends. The surfaces thus have a substantially cylindrical shape. Of course, not all embodiments of the helical applicator head according to the present disclosure must have the same diameter even if the diameter is uniform between the ends; FIG. 6 illustrates an embodiment of a surface 612 that is also uniform as to coil diameter, D, but the coil diameter is not the same as the diameter d illustrated in FIGS. 1 and 2, for example.

Figure 7:
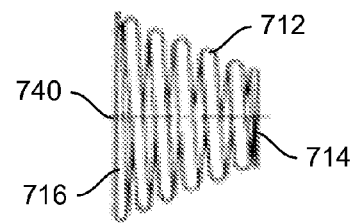
FIG. 7 is an enlarged plan view of an applicator surface in the form of a conically-shaped coil.
Figure 8:
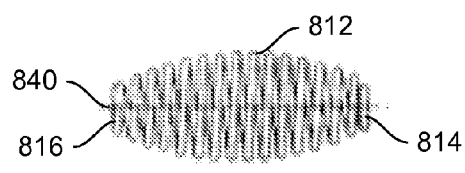
FIG. 8 is an enlarged plan view of an applicator surface in the form of a barrel-shaped coil.
Figure 9:
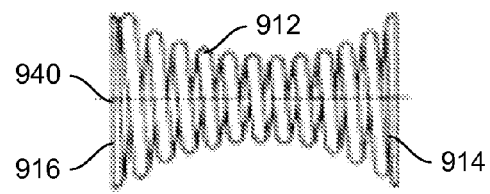
FIG. 9 is an enlarged plan view of an applicator surface in the form of an hourglass-shaped coil.
Figure 10:
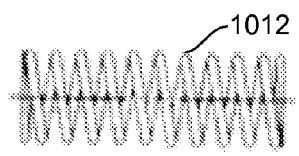
FIG. 10 is an enlarged plan view of an applicator surface in the form of a coil with a fixed pitch that is larger than that illustrated in FIGS. 1 and 2.
Figure 11:
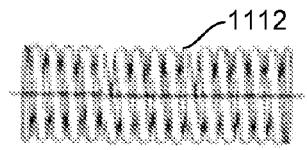
FIG. 11 is an enlarged plan view of an applicator surface in the form of a coil with a fixed pitch that is smaller than that illustrated in FIGS. 1 and 2.

Further, it will be recognized that the diameter of the coil need not be uniform, having the same surface diameter from one end of the applicator surface to the opposite end of the applicator surface. FIGS. 7-9 illustrate a variety of alternative embodiments of surface shape wherein the coil diameter varies between the ends. It will be recognized that these shapes could be combined to provide an even greater diversity of shapes, wherein for example a first section is defined by the shape of FIG. 7 while a second section is defined by the shape of FIG. 9.

The surface 712 of FIG. 7, the surfaces 812 of FIG. 8, and the surface 912 of FIG. 9 are all members of a larger family of surfaces wherein the surface has a varying diameter along the length of the longitudinal axis of the surface. However, one may discuss FIG. 7 as belonging to a different class of surfaces than those of FIGS. 8 and 9 as well.

In particular, the embodiment of FIG. 7 may be described as a member of a class of surfaces wherein the diameter at one end is larger than the diameter at the opposite end. While the diameters vary from the end 714 to the end 716 largest to smallest, it will be recognized that this order may be reversed. Further, it will be recognized that while the diameters vary such that the surface 712 has a conical shape, the diameters of the coils between the ends 714, 716 may vary in other fashions as well.

In contrast to the embodiment of FIG. 7, the embodiments of FIGS. 8 and 9 may be described as members of a class of surfaces wherein the diameter at one end 816, 916 is substantially the same as the diameter at the opposite end 814, 914. However, the diameters of the surfaces 812, 912 between the opposing ends 814, 816, 914, 916 are different that the diameters of the surfaces at the opposing ends 814, 816, 914, 916. In the embodiment of FIG. 8, the diameter of the surface 812 between the ends 814, 816 is larger than the diameters at the opposing ends 814, 816, such that the surface 812 has a barrel shape. In the embodiment of FIG. 9, the diameter of the surface 912 between the ends 914, 916 is smaller than the diameters at the opposing ends 914, 916, such that the surface 912 has an hourglass shape.

The surfaces according to the present disclosure may also vary as to another dimension, referred to as the effective pitch, or pitch. The pitch, p, is marked out along the longitudinal axis 140 in FIG. 1. According to embodiments of the present disclosure, the pitch may vary from about 0.3 mm to about 15.0 mm, with embodiments at the upper end being for use with head hair for example. Where the target material is eyelashes, the pitch may vary from about 0.3 mm to about 3.0 mm. In fact, according to certain embodiments, the pitch may vary from about 0.4 mm to about 1.0 mm. The pitch of the surface may vary between embodiments, and may even vary between one end and the opposite end of a single embodiment.

For example, the surface 112 has a uniform pitch. Points facing each other on successive coils of the surface 112 are substantially the same distance apart. The embodiment of the surface 1012 illustrated in FIG. 10 also has uniform pitch, but the pitch of the surface 1012 is significantly larger than that illustrated in FIG. 1. In the case of an eyelash application, it is believed that the surfaces of larger pitch may provide opportunities to group a larger number of lashes together, thereby increasing the apparent volume of the lashes. By contrast, the embodiment of the surface 1112 illustrated in FIG. 11 has a uniform pitch that is significantly smaller than that illustrated in FIG. 1. In the case of an eyelash application, it is believed that the surfaces of smaller pitch provide opportunities for greater separation among the lashes, thereby increasing the separation of the lashes. In the case of a head hair application, wherein a coloring product is applied to head hair for example, it is believed that a larger or smaller pitch may be used to control the number of hairs to which the coloring product is applied, thereby affecting the width of the colored hair strand.

In fact, it may even be possible to make the pitch of the surface adjustable. That is, the distance between the first and second ends of the surface may be controlled, for example, through the use of an adjustment mechanism. The adjustment mechanism permits the coils to be drawn together, decreasing pitch, or allowed to separate, increasing pitch.

FIGS. 12A and 12B illustrate one such system. The applicator surface 1212 has a hollow space 1270 defined along the longitudinal axis 1240 thereof. One end 1214 of the surface 1212 is attached to the end 1208 of the stem 1204, which stem is also hollow. The other end 1216 of the surface 1212 is attached to a cap 1218. A rod 1242 is disposed through the hollow stem 1204 and is attached to the cap 1218. A mechanism is mounted to the handle 1202 for movement of the rod 1242, which mechanism may be simply a control surface 1244, in the form of a button, which button is attached to the rod 1242 and moves along a slot 1245 formed in the handle 1202. Movement of the control surface 1244 in the direction of the arrow in FIG. 12A moves the cap 1218 in the direction of the handle 1202, causing the pitch of the surface 1212 to decrease, as is illustrated in FIG. 12B. Movement in the opposite direction causes the pitch of the surface 1212 to increase.

FIGS. 13A and 13B illustrate another adjustment mechanism. Like the embodiment of FIGS. 12A and 12B, the adjustment mechanism of FIGS. 13A and 13B includes a rod 1342 disposed within a section 1360 of the surface 1312, which rod 1342 may be moved in one direction or another along its axis to cause the section 1360 attached thereto to increase or decrease in pitch. Like the embodiment of FIGS. 12A and 12B, this may be achieved through the use of a control surface 1344 that moves in a slot 1345. However, unlike the embodiment of FIGS. 12A and 12B, the adjustment mechanism of FIGS. 13A and 13B may include the stem 1304, into which stem 1304 the rod 1342 may be withdrawn or from which stem 1304 the rod 1342 may be advanced, and about which a second section 1362 of the helical surface 1312 may be disposed. It will be recognized that such an assembly may permit the characteristics of the section 1360 to be varied relative to the section 1362, to permit separation along one region and gathering along another region. Additionally, it will be recognized that the stem 1304 may also or in the alternative be withdrawn into or advanced from the handle 1302.

A similar effect may be achieved by moving the arms of either the embodiment of FIG. 3 or the embodiment of FIG. 4 towards and away from each other.

It is also possible to have a variable pitch along the length of a surface. For example, FIG. 14 illustrates a surface 1412 with two sections 1460, 1462 displaced longitudinally from each other along a common longitudinal axis 1440, the sections having different pitches. The user may switch between the two ends of the surface 1412 to alternatively build volume or improve separation, or to have different effects along different portions of the target material (e.g., eyelashes). FIG. 15 illustrates a surface 1512 that also has two sections 1560, 1562 with different pitches, but the different sections of FIG. 15 have different longitudinal axes as well. The user may switch between one side and the other of the head 1510 to alternatively build volume or improve separation. FIG. 16 illustrates an applicator head wherein the number of coils may vary within a single turn about a longitudinal axis of the applicator head. The applicator head 1610 has a first section 1660 and a second section 1662, the coil having one strand in the first section 1660 and two strands in the second section 1662. As illustrated, the strands in the second section 1662 may be used to define a smaller pitch in the second section 1662 than in the first section 1660.

As another variation, the handedness of the helical surface may be modified. A helix has a handedness dependent upon the direction of the twist of the helix. A helix may be right-handed or left-handed. The surfaces illustrated in FIGS. 1-16 have a single handedness. However, according to other embodiments, the helical surface may reverse handedness at some point along the length of the applicator surface. FIG. 17 illustrates as surface 1712 having a first region with right-handedness, and a second region with left-handedness. While the first and second regions may be of equal length, as illustrated in FIG. 17, this need not be the case in every embodiment.

As a still further variation, the axis of the helical surface may be modified. A helical surface may be defined about a single axis, as the case with embodiments of FIGS. 1-17. However, it is also possible for a helix to be defined about more than one axis. For example, FIGS. 18 and 19 illustrate embodiments of helical surfaces 1812 and 1912 that are defined about a plurality of axes. Although both of the surfaces 1812, 1912 are defined about at least two axes, the surface 1812 illustrates that it is possible to have a surface that is defined about more than two axes as well. As illustrated in FIG. 18, two of the axes about which the surface 1812 is defined are collinear, although the radii are different. The third axis is offset relative to the other axes, and the radius is different as well. As illustrated in FIG. 19, the axes about which the surface 1912 is defined are parallel and offset, and the radii are different as well.

Figure 20:
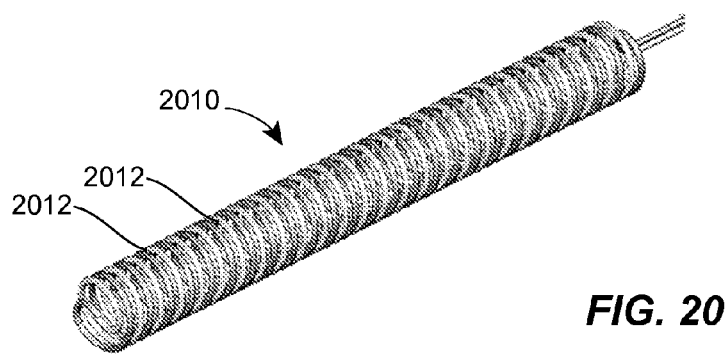
FIG. 20 is a perspective view of an applicator surface having multiple helixes, the helixes having the same coil diameter.
Figure 21:
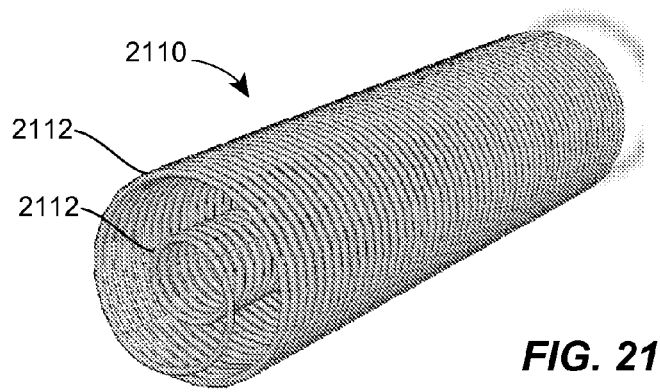
FIG. 21 is a perspective view of an applicator surface having multiple helixes, the helixes having different coil diameters.
Figure 22:
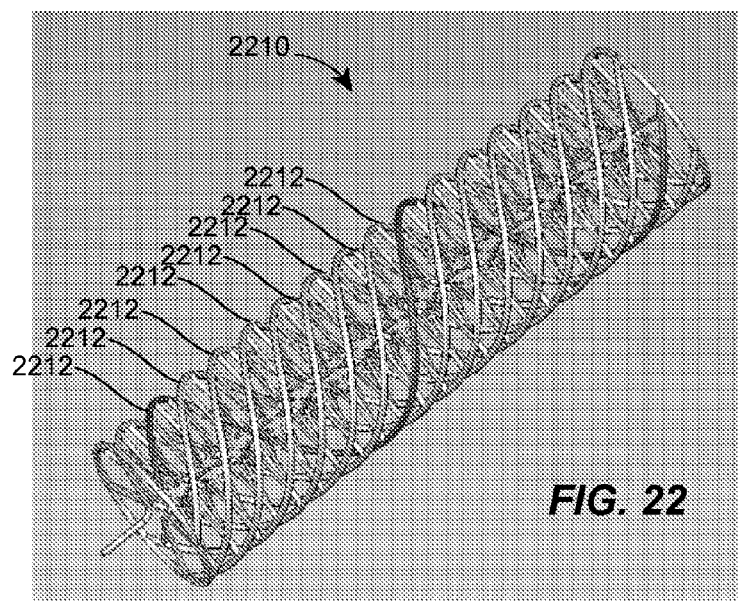
FIG. 22 is a perspective view of an applicator surface having multiple helixes, at least one of the helixes having a color that is different than the other helixes.

Nor is the head limited, as illustrated in FIGS. 1-19, to a single helix. Instead, heads 2010, 2110, 2210 are illustrated in FIGS. 20-22 wherein the heads 2010, 2110, 2210 include a plurality of helical surfaces 2012, 2112, 2212. As illustrated in FIG. 20, the head 2010 includes two helical surfaces 2012, the helical surfaces 2012 having a common longitudinal axis and a common radius of revolution about the common axis. However, the helical surface 2012 are staggered along the longitudinal axis, such that the coils of surfaces 2012 are separated from each other by the coils of the other surface 2012. As illustrated in FIG. 21, the head 2110 includes two helical surfaces 2112 that have a common longitudinal axis, but different radii of revolution about the axis, such that one helical surface 2112 appears to be disposed within the other surface 2112. The head 2210 is similar to the head 2010, in that the helixes have a common axis and common radius of revolution, but the head 2210 differs in that the head 2210 includes eight helical surfaces 2212.

Additionally, one or more projections may be attached to the applicator surface of the helical applicator head. The projections may provide additional surface area to interact with the lashes passing through the applicator. The additional surface area may provide additional opportunities for cosmetic product to come in contact with the lashes passing through the applicator head. Alternatively, the projections may provide additional opportunities to affect the shape of the lashes passing through the applicator head, imparting further curl to the lash, for example. Moreover, the projections may provide a mechanism for directing or limiting the cosmetic product to a particular section of the applicator head or surface.

Figure 23:
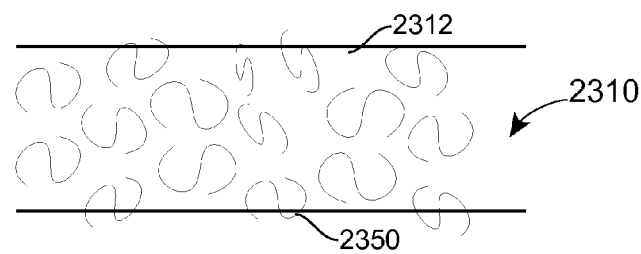
FIG. 23 is a partial plan view of an embodiment of a plurality of projections including a plurality of fibers, attached to an applicator surface according to the present disclosure.

In any event, a first embodiment of an applicator head having a plurality of projections attached to an applicator surface thereof is illustrated in FIG. 23. While only a portion of the applicator head is illustrated, it will be understood that the remainder of the applicator head, and the remainder of the applicator for that matter, may be according to any of the embodiments illustrated above. An applicator head 2310 defines an applicator surface 2312. The surface 2312 has a plurality of projections 2350 attached thereto. According to this embodiment of the present disclosure, the plurality of projections 2350 may include a plurality of fibers, which fibers may be attached intermittently to the surface 2312. As a consequence, the fibers 2350 may be attached at one end to the surface 2312, may be attached at both ends to the surface 2312, or at any point or points intermediate to the ends. According to this embodiment, the fibers are attached over the entire surface 2312.

Figure 24:
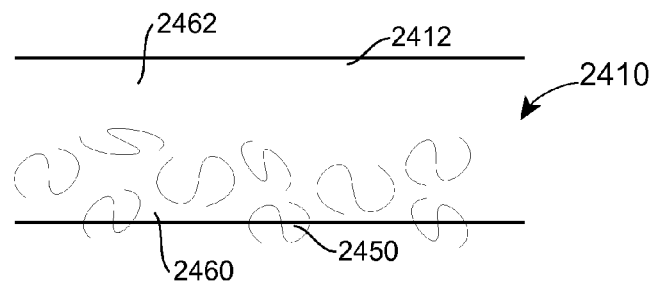
FIG. 24 is a partial plan view of a plurality of projections including a plurality of fibers, similar to FIG. 23, attached to a first section of the surface area of an applicator surface according to the present invention, but not a second section.

FIG. 24 illustrates an embodiment similar to that of FIG. 23, wherein the plurality of projections 2450 comprises a plurality of fibers. However, unlike the embodiment of FIG. 23, the embodiment of FIG. 24 illustrates the plurality of fibers attached to only a section of the surface 2412. According to the illustrated embodiment, the surface 2412 has a first section 2460, which may face towards a longitudinal axis of the applicator head 2410 for example, and a second section 2462, which may face away from the longitudinal axis. As illustrated, the plurality of projections 2414 are attached to the surface 2412 in the first section 2460, but not the second section 2462.

It will be recognized that the embodiment according to FIG. 24 only illustrates one possible arrangement of the projections on the applicator surface. It will be recognized that the surface may be divided into more than two sections, and each of the sections may have a different distribution of projections thereon. Further, the alignment of the sections need not be relative to the longitudinal axis. Instead of strips parallel to the longitudinal axis, the plurality of projections may be attached in bands or stripes in planes orthogonal to the longitudinal axis. More complex patterns, such as in the form of checkerboard or herringbone arrangements may also be used. Further, the projections may be intermittently placed in a random, intermittent pattern according to certain embodiments. In addition, patterns may be combined within the same section of the applicator head, or may vary in different sections of the applicator head (e.g., a strip pattern along a first longitudinal section of the surface followed by a striped pattern along a second longitudinal section of the surface).

Figure 25:
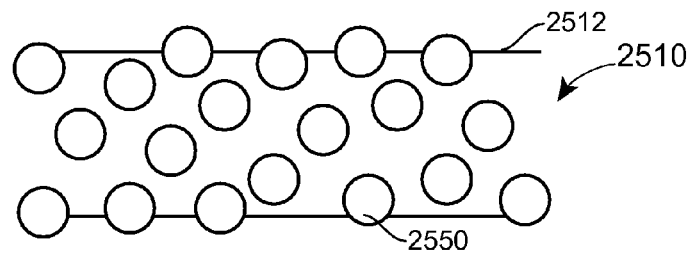
FIG. 25 is a partial plan view of another embodiment of a plurality of projections including a plurality of knob-like projections attached to the entire surface area of an applicator surface according to the present invention.
Figure 26:
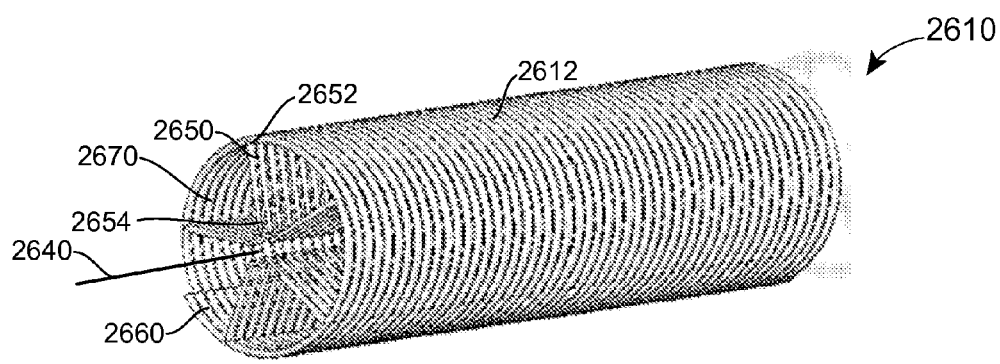
FIG. 26 is a perspective view of a plurality of projections including a plurality of rod-like projections attached to an applicator surface having a hollow space, the rod-like projections depending into the hollow space.
Figure 27:
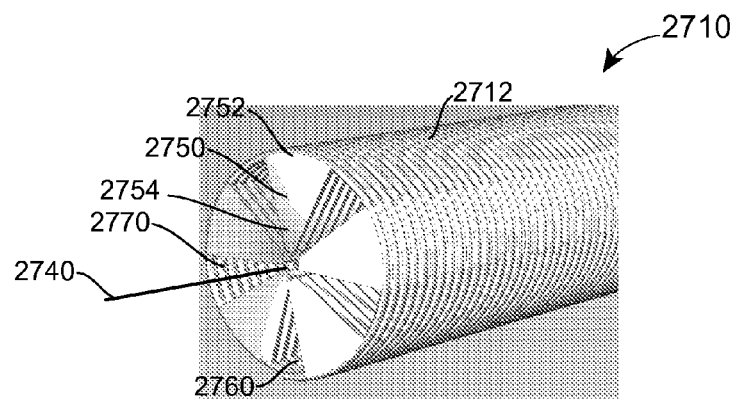
FIG. 27 is a partial perspective view of a plurality of projections including a plurality of plate-like projections attached to an applicator surface having a hollow space, the plate-like projections depending into the hollow space.

FIGS. 25-27 illustrate projections in the alternative to the fibers illustrated in FIGS. 23 and 24. However, the comments made above relative to the embodiments of FIGS. 23 and 24 apply with similar force to the embodiments of FIGS. 25-27. That is, while only a portion of the applicator head is illustrated, it will be understood that the remainder of the applicator head may be according to any of the embodiments illustrated above. Further, while a generally uniform pattern of projections disposed over a section of the applicator surface has been illustrated, it will be recognized that the distribution of the projections may exhibit any of the alternative arrangements discussed above. Additionally, the projections may depend outwardly from the surface, as well as inwardly into the hollow space defined within the surface (as illustrated in FIG. 25)

FIG. 25 illustrates an applicator surface 2512 to which are attached knob-like projections 2550. The knob-like projections 2550 are illustrated as disposed about the entirety of the surface 2512, similar to the embodiment of FIG. 23. It will be recognized that the projections could also be disposed only on a section of the surface, similar to the embodiment of FIG. 24. While the knob-like projections appear to have a hemispherical shape as illustrated, it will be recognized that other shapes may be used as well, such as pyramidal or frusto-conical shapes.

FIG. 26 illustrates an applicator head 2610 with an applicator surface 2612 to which are attached a plurality of rod-like projections 2650. The rod-like projections 2650 are illustrated as attached to only a section 2660 of the surface 2612 facing toward a longitudinal axis 2640 of the applicator head 2610. Thus, the rod-like projections 2650 depend into a hollow space 2670 defined at least in part by the section 2660 of the surface 2612 of the head 2610 facing toward the axis 2640. As illustrated, the rod-like projections 2650 are attached at a first end 2652 to the surface 2612 and have a second, free end 2654 that depends into the hollow space 2670. The ends 2654 of the projections 2650 are proximate to each other, but do not touch, as illustrated. It will be recognized that the ends 2654 may be spaced further from each other; alternatively, the ends 2654 may touch or be attached to each other, whether directly or indirectly. Further, while the rod-like projections may appear to have a relatively thin, circular cross-section, both the thickness of the projections and their cross-sectional shape may vary.

FIG. 27 illustrates an applicator head 2710 with an applicator surface 2712 to which are attached a plurality of plate-like projections 2750. The plate-like projections 2750 are illustrated as attached to only a section 2760 of the surface 2712 facing toward a longitudinal axis 2740 of the applicator head 2710. Thus, the plate-like projections 2750 depend into a hollow space 2770 defined at least in part by the section 2760 of the surface 2712 of the head 2710 facing toward the axis 2740. As illustrated, the plate-like projections 2750 are attached at a first end 2752 to the surface 2712 and have a second, free end 2754 that depends into the hollow space 2770. The ends 2754 of the projections 2750 are proximate to each other, but do not touch, as illustrated. It will be recognized that the ends 2754 may be spaced further from each other; alternatively, the ends 2754 may touch or be attached to each other, whether directly or indirectly. Further, while the plate-like projections have a relatively thin cross-section with a sector-like shape, both the thickness of the projections and their shape may vary.

Figure 28:
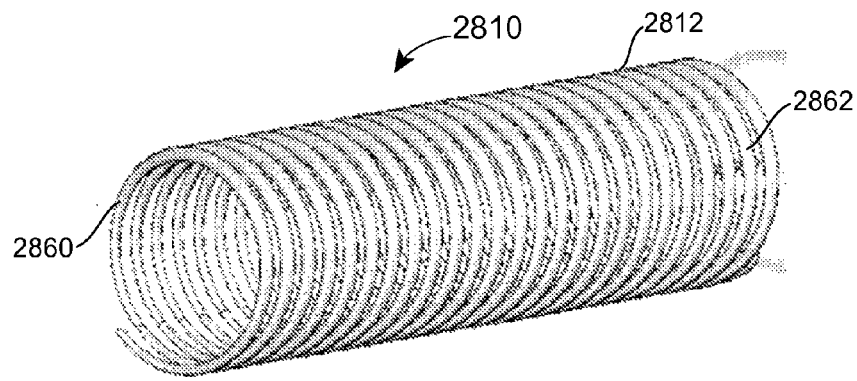
FIG. 28 is a perspective view of a helical applicator head having a first region with a first cross-sectional area and a second region with a second cross-sectional area.

FIG. 28 illustrates an applicator head 2810 with a surface that may have or may appear to have a first cross-sectional area in a first section 2860 and a second cross-sectional area in a second section 2862. The surface 2812 of the first section 2860 may be described as having no projection, while the surface 2812 of the second section 2862 may be described as having a projection depending therefrom, which projection increases the cross-section area of the surface 2812 in that section 2862. Such a description may be used relative to those embodiments wherein the surface 2812 in the second section 2862 is increased in cross-sectional area by depositing material, through dip coating for example, on a coil having a uniform cross-sectional area to start. In this regard, it will be noted that the projections according to the present disclosure need not be discretely attached to the applicator surface as in FIGS. 23-28; instead, as in the embodiment of FIG. 28, the projections may be so integrally and continuously attached to the applicator surface as to make it difficult to determine where the surface separates from the projections.

Of course, dip coating is not the only method of fabricating a surface 2812 as illustrated in FIG. 28. For example, an alternative method of fabrication, such as molding or extrusion, may be used to vary the cross-sectional area of the surface 2812 between the first and second sections 2860, 2862. According to such an embodiment, one may still discuss the projections of section 2862 relative to section 2860, even though no material is added to an underlying surface according to the method of fabrication. Alternatively, one may discuss the resultant change in cross-sectional area of the surface 2812 without reference to projections as such.

Further, it will be observed that the variation in cross-sectional area of the surface 2812 may have an impact on other characteristics of the surface 2812, other than the cross-sectional area of the surface 2812. That is, the change in cross-sectional area in the section 2862 relative to that of the section 2860 may have an effect on the effective pitch as well. It may be noted from the illustrated embodiment in FIG. 28, that the effective pitch in the section 2860 may be larger than the effective pitch in the section 2862. Thus, the change in the cross-sectional area of the surface 2812 may have an effect on effective pitch, although that is not necessarily the case for all embodiments, for the surface 2812 may be shaped so as to maintain a constant pitch through variation of another characteristic, such as curvature. It will also be recognized that, if the section 2862 is looked at as a series of smaller sections, each with a profile having a different effective diameter, it may be possible to suggest that the section 2862 represents a section of the surface 2812 that has a varying axis of rotation, in that the effective diameter of the surface 2812 changes, with a resultant change in the position of the effective axis.

In addition to the variations listed above, any of a number of materials may be applied to the applicator surface to modify the surface, or a portion or region thereof. For example, coatings may be applied to the surface to make the surface hydrophobic or hydrophilic. In doing so, the coating may change the surface chemistry of the underlying coil material that structurally defines the shape of the surface. For that matter, the surface chemistry may be modified in other ways. Coating(s) may also be applied to be transferable to the lashes that pass through the applicator, such as a transferable coating applied to the outwardly-facing region of the surface that may act as a "topcoat" to any "base coat" transferred to the lashes from the inwardly-facing region of the surface. In applying the coatings, one may wish to control such variables as the size of the region to which the coating is applied, the speed (or dwell time) at which the coating is applied, and the rheology of the coating material, for example.

Furthermore, the coating may provide color to the applicator surface, which color may be the same for the entire head or surface or may be different on different features or regions of the head or surface. The different colors may be used to communicate a product benefit to the user, or to identify a particular product for the user, thereby enhancing the product's recognizability to the user. Additionally or alternatively, the different colors may be used to assist a user in understanding how the product works or the product's intended usage according to the instructions.

Such a coating could be used to highlight regions of differing pitch, diameter, cross-sectional area, etc. However, the regions of different color may be applied instead to different regions of the surface that have similar characteristics (pitch, diameter, cross-sectional area, etc.), but different spatial locations along the surface. For example, the region of the surface facing the hollow space may have a contrasting color to the region of the surface facing away from the hollow space, or one longitudinal region may have a contrasting color relative to another longitudinal region. Nor must the regions of different color be of equal size; instead, the one region may be larger than the other.

Figure 29:
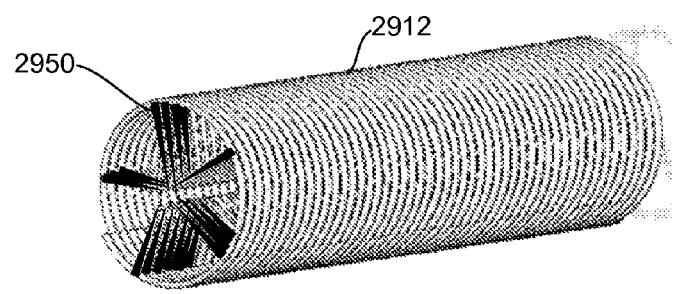
FIG. 29 is a perspective view of an applicator surface having one or more of the projections having a color that is different than the color of the surface to which they are attached.

FIG. 22 illustrates an embodiment wherein color is used to differentiate one helical applicator surface 2212 of a multi-helix head 2210 from the other helical surfaces 2212 by having the one helical applicator surface be of a different color than the other helical applicator surfaces. FIG. 29 illustrates an embodiment wherein color is used to differentiate one or more of the projections 2950 from the surface 2912 to which the projections 2950 are attached by having the surface be a different color than some or all of the projections. It will be recognized that the different colors may be used to differentiate different regions of the projections 2950 (for example, the free end of the projection relative to the end attached to the surface 2912).

The colors used may be chromatic or non-chromatic. For example, in the illustration of FIG. 22, the one surface may have a chromatic color, and the other surfaces may have a non-chromatic color. Similarly, in the illustration of FIG. 29, the projections may have a chromatic color, while the surface has a non-chromatic color. However, it will be recognized that the colors used for different surfaces and/or different parts of the applicator (surfaces, projections, sources, etc.) may be contrasting colors, without one necessarily being chromatic.

In the alternative, the color differences between the surface 2912 and the projections 2950, for example, may be defined not by a coating applied to the surface 2912 or the projection 2950, but because of the color of the surface 2912 or projection 2950 defined when the surface 2912 or projection 2950 is formed.

The materials and methods for fabricating the embodiments of the helical applicator head may be as different and varied as the embodiments described above.

The materials used to fabricate the applicator heads may include metals, polymers (thermoset and thermoform), adhesive resins, epoxy, glass and cellulose, for example. A single applicator head may include material selected from only one group, such as polymer resins. However, a single applicator head may include materials from more than one group, such as glass or cellulose distributed or mixed in a polymeric resin or a polymeric resin applied over a metal.

To fabricate an applicator head from metal, the material may be drawn through a sizing fixture to form a wire, which wire is then coiled or spooled on a mandrel. For compound coils having more than one circular equation defining their shape, a series of mandrels may be used to size relatively large and relatively small radii intermittently or in series. In the alternative, sheet stock material may be formed into the desired shape using eyelet tooling to size the material and then cutting away excess material to create the final surface. Sheet stock material may also be slit, rolled and welded before or after excess material is removed to form the desired surface.

To fabricate an applicator head using polymers, single or multiple shot injection molding may be used, as may extrusion molding, using static and/or dynamic extruder heads in combination with coiling mandrels or rollers to create the desired helical surface. The head may also be molded using the MOLTRUSION technique of Geka Brush GmbH, Waizendorf, Germany, where a primary hollow structure is molded and then a second material is forced from the inside of the structure with sufficient pressure to allow controlled extrusion of the internal material through the structure to form secondary surfaces on the structure. Additionally, the surfaces may be formed using stereo lithography, with heat or lasers, or according to another solidification process or additive deposition process, as may be used for rapid prototyping.

In any event, the fabricated structure may be subjected to other processing steps to define the finished applicator head. A metal surface may be tempered or carburized to produce a desired stiffness under axial and perpendicular axis loadings. Other secondary surface treatments may also be used, including exposure to (corrosive) gases, bombardment by erosive elements (such as glass or sand blasting), tumbling with ball bearings, forging or hammering, and counter-rolling (such as with pressure by means of internal and externals mandrels or rollers). In addition, as mentioned above, it may be desirable to apply various additive coatings to improve the applicator surfaces preferential action with various products. These coatings may be sprayed, dipped, applied through electrolysis, sputtered or vacuum moralized, printed, or flocked with various fiber combinations.

Relative to the embodiment illustrated in FIG. 28, wherein the coils appear to have a first cross-sectional area in the first section 2860 and a second cross-sectional area in the second section 2862, the areas of differing cross-section may be built-up through a process of dip coating. That is, the process may start with a spiral coil having relatively uniform cross-sectional area through out. By dipping only a portion of the coil (the second section 2862) in a coating material, the cross-sectional area of the coil in that region of the coil may be built up relative to the remainder of the coil. This dipping may occur relative to one or a series of coating materials, and the dipping may be performed once or a series of times. Further, in addition to the depth of the dip, the speed (or time period) of the dip and the rheology of the coating material, for example, may be varied to control the accumulation of coating material on the region of interest of the coil.

Having thus described a variety of embodiments of helical applicator surfaces, reference is now made to FIGS. 30-34, wherein are illustrated a variety of adjustment mechanisms which may be used to vary the characteristics of the helical surfaces previously described. These adjustment mechanisms may be used to vary one characteristic, such as the pitch of the surfaces. In this regard, they are similar to the mechanisms illustrated in FIGS. 12 and 13. However, certain of these adjustment mechanisms may also be used to vary more than one characteristic with a single input, such as the pitch and the effective diameter of the surface.

Figure 30A:
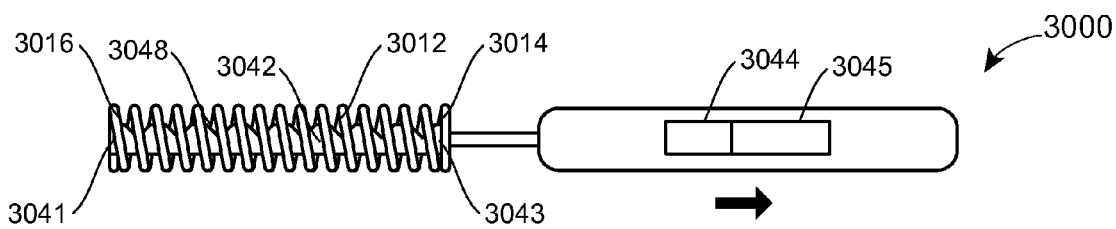
FIG. 30A is a plan view of an adjustment mechanism for varying the characteristics of an applicator surface with the surface in a first, straight state.
Figure 30B:
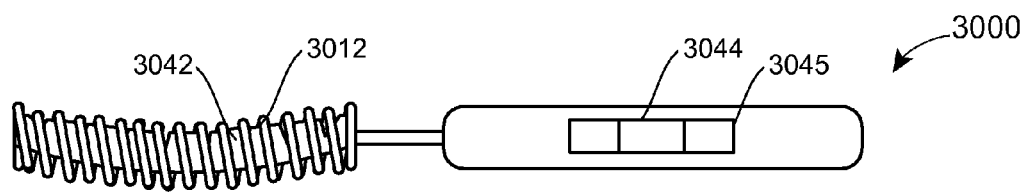
FIG. 30B is a plan view of the adjustment mechanism of FIG. 30A with the surface in a second, curved state.

FIGS. 30A and 30B illustrate an embodiment of an adjustment mechanism that includes a bendable rod 3042 disposed within a helical applicator surface 3012. It is not necessary that the adjustment mechanism be attached to the applicator surface 3012, for the movement of the rod 3042 may vary the curvature of the surface 3012 without the attachment between the two structures. However, according to certain embodiments, the bendable rod 3042 may be attached or coupled to the helical applicator surface 3012 at one end 3014 of the surface 3012, the other end 3016, or both. The bendable rod 3042 also has a control wire (not shown) disposed therein. The control wire has a first end that is attached to a distal end 3041 of the rod 3042, and passes through a passage within the rod 3042 to exit from a proximal end 3043 of the rod 3042. The wire may be coupled to a control surface 3044, such as a slide received in a slot 3045. A force applied to the control surface 3044 in the direction of the arrow in FIG. 30A causes the curvature of the rod 3042 to change from the relatively straight shape illustrated in FIG. 30A to the relatively curved shape illustrated in FIG. 30B. It will be recognized, the surface of the rod 3042 may have one or more slits 3048 formed in the surface of the rod 3042 along either one side, or the opposing side, or both sides.

Figure 31A:
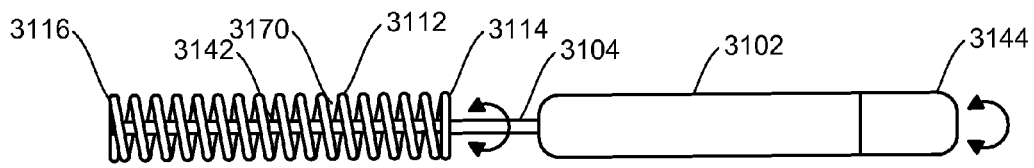
FIG. 31A is a plan view of another adjustment mechanism for varying the characteristics of an applicator surface with the surface in a first, relaxed state.
Figure 31B:
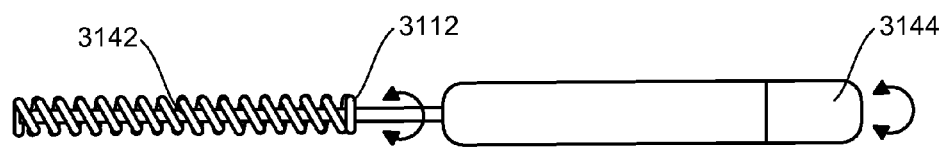
FIG. 31B is a plan view of the adjustment mechanism of FIG. 31A with the surface in a second, altered state.

FIG. 31A and 31B illustrate another embodiment of an adjustment mechanism according to the present disclosure. According to this embodiment, a rod 3142 is disposed in the hollow space 3170 within the surface 3112. The helical applicator surface 3112 has one end 3116 attached to a first end of the rod 3142, while the second end 3114 of the surface 3112 is coupled to the handle 3102 via the stem 3104. The rod 3142 is moveable relative to the handle 3102, and in particular is moveable about its axis relative to the handle 3102. Movement of the rod 3142 may be achieved through the use of a rotatable control surface 3144, which control surface 3144 may be disposed at either end of the handle 3102. Movement of the rod 3142 about its axis may cause the surface 3112 to vary its pitch and its diameter from that illustrated in FIG. 31A to that illustrated in FIG. 31B.

According to certain embodiments, the movement of the rod 3142 about its axis may be stopped and the rod 3142 held in place at any point during the rotation of the rod 3142 about its axis. Alternatively, the rod 3142 may be stopped and held in pact only at specific points during its rotation, by a detent mechanism, for example. As a still further alternative, the movement of the rod 3142 may automatically oscillate, such that the rod 3142 rotates in a first direction for a predetermined period of time to change the characteristics of the surface 3112, and then rotates automatically in a second direction for a predetermined period of time to return the surface 3112 to its initial starting shape. It will be further recognized that the movement of the rod 3142 need not oscillate equally between two shapes for the surface 3112, but may oscillate between a first shape and a plurality of different shapes, correspondence to different states.

Figure 31C:
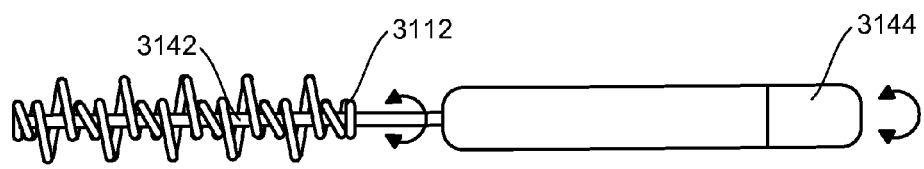
FIG. 31C is a plan view of an alternative adjustment mechanism, relative to that illustrated in FIGS. 31A-B, with the surface in a second, altered state.

While the changes appear uniform along the length of the surface 3112 illustrated in FIG. 31B, the materials used to fabricate the helical applicator surface 3112 may be varied to vary the response of the surface 3112 to the movement of the rod 3142 about its axis. FIG. 31C illustrates a helical applicator surface 3112 with an adjustment similar to that illustrate in FIGS. 31A and 31B, in that a rod 3142 is disposed along the hollow space 3170 within the surface 3112, and one end of the surface 3116 is attached to a first end of the rod 3142 and a second end 3114 of the surface 3112 coupled to the handle 3102. However, unlike the embodiment illustrated in FIGS. 31A and 31B, the surface 3112 may have regions that are stiffer than other regions and regions that are weaker than other regions. Movement of the rod 3142 about its axis affects these regions of varying stiffness and weakness, causing a pattern wherein the pitch and diameter of the surface may vary along the longitudinal axis of the surface 3112.

FIGS. 32A and 32B illustrate still another embodiment of an adjustment mechanism according to the present disclosure. The adjustment mechanism of FIGS. 32A and 32B includes a case 3242 that depends from the handle 3202. As illustrated, the case 3242 is in the form of a cylindrical tube. The case 3242 has a plurality of openings or apertures 3264 formed in a wall thereof in communication with the hollow space of the case 3242. The case 3242 also has a crankshaft 3266 disposed therein (see FIGS. 32B and 32C), the shaft 3266 having connection regions disposed longitudinally along the crankshaft 3266 and aligned with the openings or apertures 3264 of the case 3242. The helical applicator surface 3212 has rod-like projections 3268 depending inwardly into the hollow space 3270 of the surface 3212, and thus into the openings 3264 in the case 3242. The projections 3268 are attached to the connection regions of the crankshaft 3266 so as to be moveable with the connection regions of the crankshaft 3266. Movement of the crankshaft 3266 causes movement of the projections 3268, causing the opposing inner surfaces of the surface 3212 to be moved relative to each other, which in turn may cause a change in the shape of the surface in planes orthogonal to the longitudinal axis (or axes) of the surface and/or a change in the effective diameter.

FIGS. 33 and 34 illustrate alternative embodiments of the adjustment mechanism of FIG. 32. In this regard, a case 3342, 3442 is disposed within the hollow space 3370, 3470, the case 3342, 3442 having an internal hollow space in which is disposed a moveable shaft 3366, 3466. However, unlike the embodiment of FIG. 32, the embodiments of FIGS. 33 and 34 do not have a plurality of rods attached to the surface 3312, 3412 and the shaft 3366, 3466.

Instead, the embodiment of FIG. 33 includes a plurality of cams 3372 that are longitudinally spaced along the shaft 3366. FIG. 33 illustrates one of the cams 3372 as seen in a cross-section of the head 3310 taken in a plane orthogonal to the longitudinal axis of the head 3310. The cams 3372 are attached to the shaft 3366 to be pivotally moveable between a first position (shown in solid line), wherein at least a first portion of the cam 3372 is disposed within the case 3342, and a second portion (shown in dashed line), wherein at least the first portion of the cam 3372 is disposed outside of the case 3342. According to the illustrated embodiment, the cam 3372 is fully received within the case 3342 in the first position, and almost entirely outside the case 3342 in the second position. The cams 3372 may be biased toward the first position through the use of a resilient member, such as a spring, for example. The cams 3372 may be urged from the first position to the second position through movement of the shaft 3366 about its axis.

The cams 3372 each have a cam surface 3373 that may cooperate with the inner section of the helical applicator surface 3312 to change the characteristics of the applicator surface 3312. For example, the movement of the cam 3372 between the first and second positions may change the shape of the applicator surface 3312 from, for example, a circular shape to an elliptical shape in planes orthogonal to the longitudinal axis (or axes) of the surface 3312 and/or a change in the effective diameter. It is not necessary that the cam surfaces 3373 of each of, or even a majority of, the cams come in contact with the inner section of the helical applicator surface 3312 to cause a change in the shape of the applicator surface 3312. In fact, it may be possible that the cams 3372 may be oriented relative to each other along the shaft 3366 to only move certain of the cams 3372 between the first and second positions in response to a particular movement of the shaft 3366 about its axis.

FIG. 34 illustrates another embodiment that includes at least one cam 3472 that is pivotally attached to the shaft 3466 and is movable with the shaft 3466 between the first and second positions. However, unlike the embodiment of FIG. 33, at least one follower 3474 is provided, which follower 3474 cooperates with an inner section of the helical applicator surface 3412 to cause a change in the shape of the applicator surface 3412, rather than a surface 3473 of the cam 3472 cooperating with the surface 3412. Movement of the shaft 3466 may cause both followers 3474 to move between a first and a second position at the same time, as illustrated. However, according to other embodiments, the cams 3472 may be shaped differently or attached to the shaft 3466 differently to move different followers 3474 between the first and second positions at different times. For example, the cam 3472 may be shaped more like that illustrated in FIG. 33, such that only one of the followers 3474 moves outwardly and inwardly from the case 3442. As was the case with the embodiment of FIG. 33, the followers 3474 may be biased toward the position illustrated in FIG. 34, from which position the followers 3474 may be advanced.

Tubes, rods, and other structures may be disposed within the hollow space defined by the helical applicator surface for other reasons as well. For example, the tubes, rods and other structures may be used to rigidify the helical applicator surface by being attached to the helical applicator structure at various points. According to certain embodiments, the tubes, rods, and other structures will be spaced from the inner portion of the applicator surface so as to permit the eyelashes or other keratinous material to pass past the surface and into the hollow space about which the helical surface is disposed.

Figure 35A:
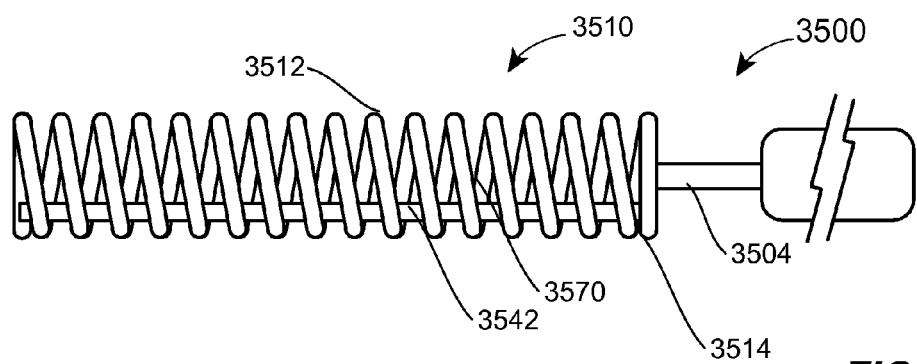
FIG. 35A is a partial plan view of an applicator surface with a bar disposed within the hollow space defined by the applicator surface to disrupt the motion of target material passing past the applicator surface.
Figure 35B:
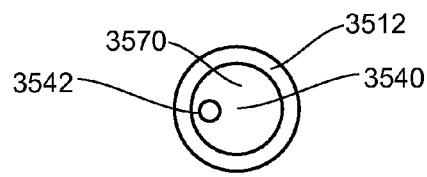
FIG. 35B is an end view of the applicator surface and bar arrangement of FIG. 35A.

A further embodiment of the helical applicator head 3510 with a tube, rod or other structure disposed in a hollow space defined by the helical applicator surface 3512 is illustrated in FIGS. 35A-B. According to this embodiment, a helical applicator surface 3512 has a first end 3514 coupled to a stem 3504. The helical applicator surface 3512 includes a hollow space 3570 in which is disposed a rod 3542, which may be referred to as a jump bar. The rod 3542 may be attached at either end to the surface 3512, or may be otherwise coupled to the surface 3512, the stem 3504 or other structures. As best seen in FIG. 35B, the rod 3542 is offset relative to the longitudinal axis 3540 of the head 3510. As the head 3510 is revolved about its axis 3540, either manually or automatically, the target material, such as eyelashes, pass into the hollow space 3570. However, as the lashes contact the rod, the lashes are pushed out of the space 3570.

This movement may permit, for example, the user to visualize the motion of the head 3510 by visualizing the motion of the eyelashes as they are pushed upward and outward from the space 3570. Visualization of the motion of the head 3510 may also be assisted by coloring a part of the head a different color than the remainder of the head, as is illustrated in FIG. 22, for example, wherein one of the multiple helical surfaces is a different color than the others. The pushing of the target material from inside the surface to outside the surface 3512 may also assist in varying the placement of the target material relative to the inwardly-facing and outwardly-facing sections of the surface 3512, as well as potentially varying longitudinal placement as well. Further, the pushing of the target material may provide a "lift" effect to the target material, by applying a force tangential to the helical surface 3512.

Figure 36:
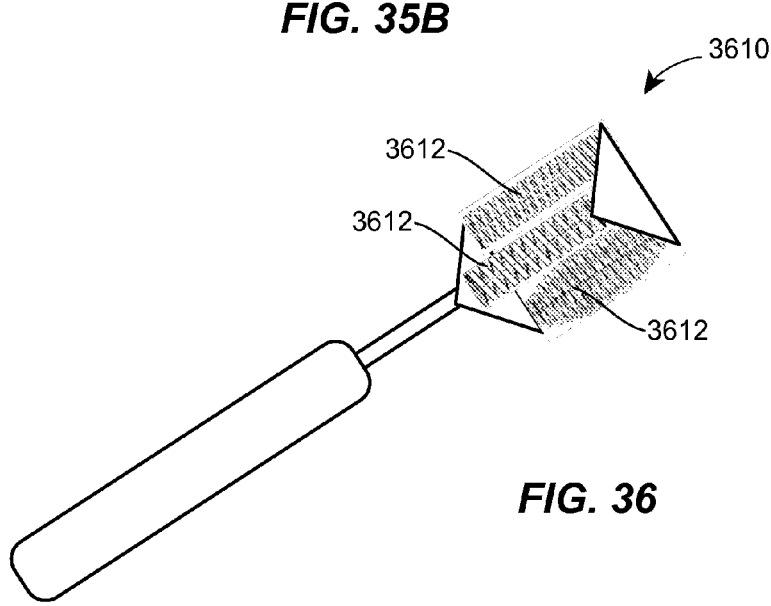
FIG. 36 is a partial, schematic view of a multiple helical applicator surface head, which surfaces may or may not have adjustment mechanism as described above.

According to certain embodiments, the head may include multiple helical applicator surfaces, wherein each of the helical surfaces may have different characteristics than the other surfaces that define, in part, the head. FIG. 36 illustrates one such embodiment, wherein the head 3610 includes a plurality of helical applicator surfaces 3612. While the surfaces 3612 appear disposed concentrically at a common distance about a common axis, one or more of the surfaces 3612 may be offset (radially inwardly or outwardly relative to the common axis) relative to the other heads. For that matter, groups of the surfaces 3612 may be disposed about different axis, rather than all of the surfaces 3612 disposed about a common axis. The surfaces 3612, individually, may have any of the characteristics of the surfaces discussed above, and may be combined with one or more of the sources discussed below.

That is, one of the surfaces 3612 may have a first pitch, while another may have a smaller pitch, and still another larger pitch. For that matter, one surface 3612 may have a fixed pitch, while another surface 3612 has an adjustable pitch. Still further, one of the surfaces 3612 may have a single axis, while another surface 3612 may have more than one axis. Alternatively, the surfaces may have been grouped, such that one group has more than one surface disposed about a common axis at a common distance, while another group has more than one surface disposed about a common axis but at a variety of distances. Further, certain surfaces may have projections, or certain types of projections, while other surfaces have different or no projections. Simply put, a wide variety of embodiments may be possible.

Cosmetic or Other Product Source

The applicator surfaces described herein may be used with a variety of products. According to certain embodiments, as discussed in greater detail below, the applicator surfaces may be used with cosmetic products, such as mascara. It will be recognized, however, that much of this discussion is thus applicable to applicators for other products, such as those applied to head hair.

The cosmetic product may be in the form of a solid, a semi-solid or a liquid. However, it is also possible for the applicator surfaces described herein to be used with products in the form of powders and fibers, for example. The powder may be loose or bound together and may have a uniform spherical shape, a rod-like or fiber-like shape, a platelet or flat shape, an irregular shape, or some combination of these shapes. These powders may add pearlescence to the applied product (as a topcoat, for example), or greater volume and/or length.

In regard to mascaras, it will be recognized that this type of product may take the form of cakes or blocks, creams, gels, semi-solids, and low viscosity liquids. In fact, cake mascaras were originally the most popular form, formulated to include at least 50% soap with the pigment mixed in with the soap cakes. Waxes were later incorporated to improve the water-resistant properties. Presently, mascara formulations includes anhydrous, water-in-oil emulsions, oil-in-water emulsions, and water-based mascaras that contain little or no oil phase. The formulations may also include multiple emulsions, such as water-in-oil-in-water emulsions. Moreover, as to the water-based emulsions, these emulsions may contain emulsified waxes and polymers, usually with pigments dispersed into the water phase. Regardless of the specific chemistry, these products may influence the color, shine, curl and/or length of the eyelashes to which they are applied.

It will also be recognized that products other than cosmetic products may be provided by the sources discussed below. For example, a source may provide an adhesive product. The adhesive product may be transferred to the target material, such as eyelashes, and may assist in maintaining groupings of eyelashes formed as a consequence of interaction between the eyelashes and the helical applicator surface. Alternatively, the adhesive product may cause the target material to become temporarily bound to the source, which may permit the applicator surface to interact with the target material in a fashion different from that which would occur if the target material was able to move freely relative to the applicator, the applicator head and/or the applicator surface.

Figure 37:
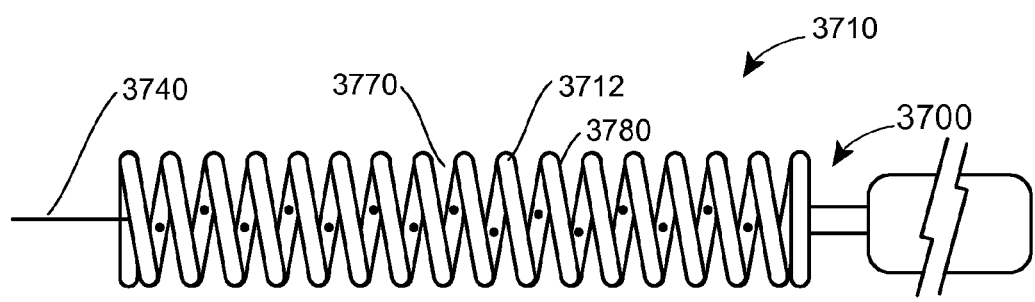
FIG. 37 is a partial plan view of a cosmetic applicator with a surface having a hollow interior space in communication with a source of cosmetic product and at least one outlet port through which the cosmetic product exits the surface.

FIG. 37 illustrates a first embodiment wherein the cosmetic product is applied to a surface from a hollow space defined in the applicator surface. As illustrated, an applicator head 3710 includes an applicator surface 3712. The applicator surface 3712 includes a hollow interior space, such as is illustrated in FIG. 5D. The hollow interior space is in communication with a source of cosmetic product. The hollow interior space is also in communication with a number of ports, through which the cosmetic product exits the hollow interior space. The portions of the surface 3712 that define the ports may have a profile similar to that illustrated in FIG. 5E. The cosmetic product may be ejected from the ports under pressure to contact the eyelashes and/or the region of the surface 3712 facing the axis 3740, by applying a force to the source of cosmetic product in communication with the hollow interior space in the applicator surface, for example. Alternatively, the cosmetic product may "weep" from the ports so as to be applied to the eyelashes or inwardly-facing region of the surface 3712.

Figure 38:
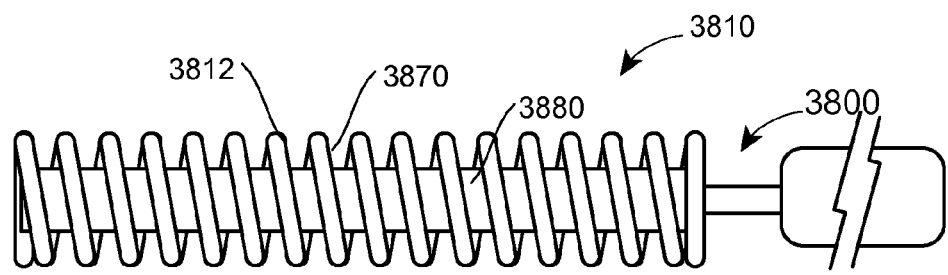
FIG. 38 is a partial plan view of a cosmetic applicator in combination with a source of cosmetic product, the cosmetic product including a rod-like projection of solid or semi-solid cosmetic product.
Figure 39:
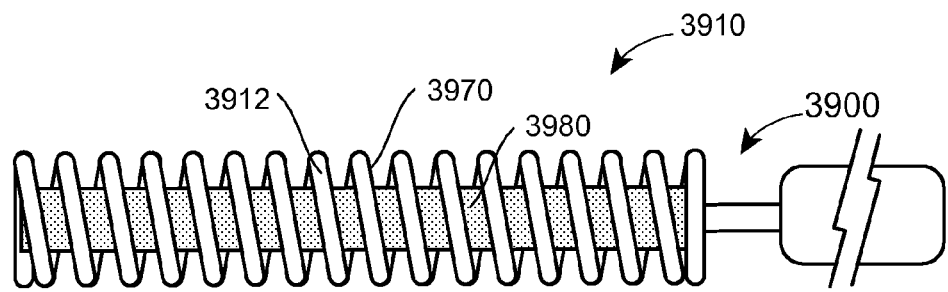
FIG. 39 is a partial plan view of a cosmetic applicator in combination with a source of cosmetic product, the source including an absorbent material at least partially soaked in a cosmetic product.
Figure 40:
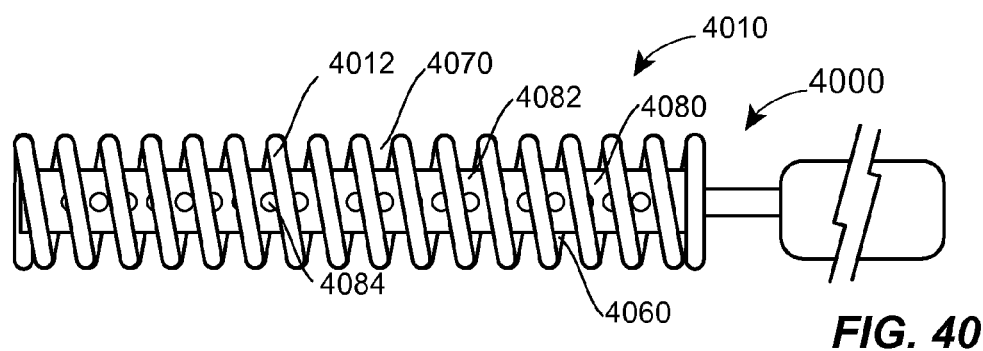
FIG. 40 is a partial plan view of a cosmetic applicator in combination with a source of cosmetic product, the source including a container at least partially filled with a cosmetic product and having at least one outlet port through which the cosmetic product exits the container.

FIGS. 38-40 illustrate a variety of alternative cosmetic sources that may be used with applicators according to the present disclosure. Common to all of the illustrations is the arrangement of the cosmetic source within a hollow space defined at least in part by a surface of the applicator head. While the cosmetic sources are illustrated as being disposed within the hollow space, it will be recognized that the cosmetic sources may depend beyond the end of the applicator head. Such an arrangement may be particularly useful where, as in FIG. 39, the cosmetic source includes an absorbent material that soaks up the cosmetic product between uses from an external supply of the product. According to such an embodiment, it may be preferred that only the source comes in contact with the external supply. Other modifications will also be recognized, such as placement of the source within the space, but not aligned along the longitudinal axis of the applicator head, for example.

Starting with FIG. 38, an applicator 3800 is illustrated with a helical applicator head 3810. For ease of illustration and to permit better visualization of the cosmetic source, the head 3810 lacks certain of the features described above relative to the various embodiments of the applicator. It will be recognized that the applicator 3800 may include features from any or all of these other embodiments. The applicator head 3810 has a hollow space 3870 into which is disposed a cosmetic source 3880. According to the present embodiment, the cosmetic source 3880 is formed of a rod-like structure of solid or semi-solid cosmetic product. Lashes would thus come in contact with the source 3880 upon passing through the head 3810. Lashes may transfer some of the product from the source 3880 to the head 3810 over time, such that subsequently lashes may come into contact with the cosmetic product at the source 3880 as well as on the head 3810. It will be recognized that while the source 3880 has a rod-like appearance, this appearance is but one of a plurality of possible arrangements for the source 3880.

The applicator 3900 illustrated in FIG. 39 includes a head 3910 and a source 3980. The source 3980 includes an absorbent material which has been soaked in a liquid form of the cosmetic product. The cosmetic product may have a varying viscosity in accordance with, for example, the absorbance of the material used in the source 3980 and the desired ability to transfer the cosmetic product from the source 3980 to the lashes passing through the head 3910. The source 3980 may include other structures to provide rigidity or stiffness to the absorbent material, such as external cages or internal supports, although according to other embodiments the absorbent material may be suitably stiff or rigid for the intended application, as least for the intended useful life of the applicator 3900.

The applicator 4000 illustrated in FIG. 40 includes a source 4080 that may or may not rely upon the lashes coming in contact with the source 4080 to transfer the product to the lashes. Instead, the source 4080 includes a container 4082 that is at least partially filled with a liquid form of the cosmetic product during use. The container 4082 may have one or more outlet ports 4084 through which cosmetic product exits the source 4080 during use. Depending on the viscosity of the cosmetic product and the relative size of the ports 4084, for example, the product may exit through the ports 4084 by "weeping" through the outlet ports 4084. Alternatively, it may be necessary to apply a pressure to the product to force the product out of the ports 4084. According to certain embodiments, whether required to force the product out of the ports 4084, a pressure may be applied to the cosmetic product to force the product out of the ports 4084 and on to the section 4060 of the surface 4012 facing the longitudinal axis of the head 4010, and thus the source 4080, to apply product to that section of the surface 4012.

It will be recognized, relative to the embodiments of FIGS. 38-40, that the applicator surface 3812, 3912, 4012 may move relative to the source 3880, 3980, 4080, that the source 3880, 3980, 4080 may move relative to the applicator surface 3812, 3912, 4012, or that the surface 3812, 3912, 4012 and the source 3880, 3980, 4080 may move together in unison or relative to each other. For example, the surface 3812, 3912, 4012 may rotate in one direction, or may rotate selectively in both directions, or may rotate in an oscillatory fashion in both directions. The source 3880, 3980, 4080 may also rotate, in one direction, selectively in both directions, or oscillating in both directions. The axis of rotation of the source 3812, 3912, 4012 may or may not correspond to an longitudinal axis taken with reference to the outer surface of the source 3812, 3912, 4012. In addition, the source 3880, 3980, 4080 may move axially, or translate. Combinations of these motions will be recognized, and are embraced by the present disclosure.

Figure 41A:
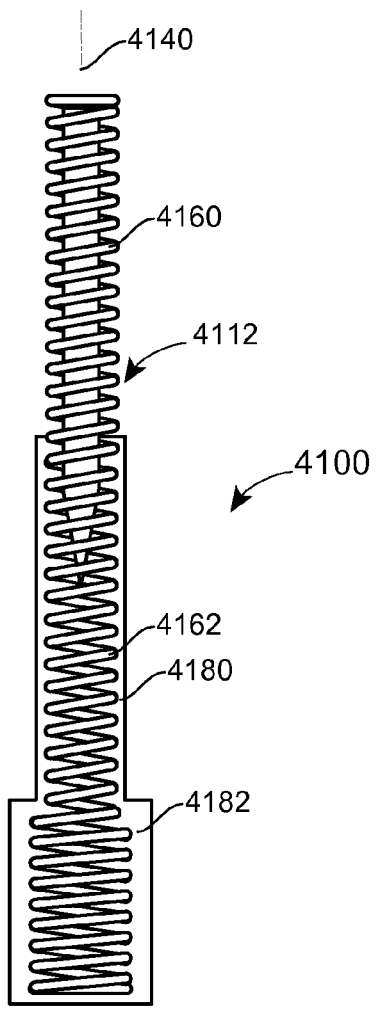
FIG. 41A is a partial, cross-sectional view of a cosmetic applicator in combination with a source of cosmetic product, the source including a container at least partially filled with a cosmetic product and utilizing a helical applicator surface as a carrier for the product to an application region.
Figure 41B:
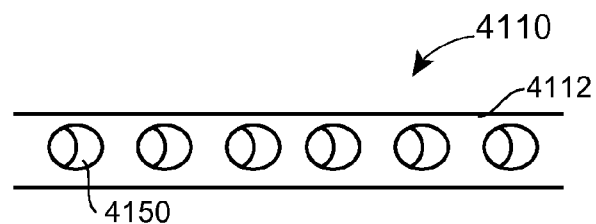
FIG. 41B is an partial, enlarged perspective view of a cosmetic applicator surface for use with the applicator and source of FIG. 41A.

Still another embodiment of a source is illustrated in FIGS. 41A and 41B. Applicator 4100 includes a helical applicator surface 4112 that is in communication with a source 4180, and in particular with a reservoir 4182. The surface 4112 has a first section 4160 that defines the head 4110 of the applicator 4100, and a second section 4162 that defines a transport mechanism for transporting product from the reservoir 4182 to the first section 4160.

To transport the product from the reservoir 4182 to the first section, the surface 4112 is coupled to a drive (not shown), which drive (not shown) causes the surface 4112 to revolve about its longitudinal axis(axes) 4140. At least the second section 4162 of surface 4112 may include a plurality of projections 4150 that are attached to the surface 4112. The projections 4150 may be in the form of dish-like, cup-like or scoop-like shapes, such that the projections 4150 define a space therein for receiving product from the reservoir 4182. According to alternative embodiments, the projections 4150 are optional. Movement of the surface 4112 about the axis 4140 causes product to be carried out of the reservoir 4182 to the first section 4160.

It will be recognized that instead of utilizing a rotating motion, the embodiment of FIGS. 41A and 41B may utilize an axial motion. That is, the surface 4112, or at least as much of the surface 4112 as defines the head 4110, may be withdrawn axially into the reservoir 4182. The surface 4112 may then be advanced axially from the reservoir 4182, with the product thus disposed on the surface 4112.

It will also be recognized that the applicator according to the present disclosure may also be used in conjunction with a more conventional cosmetic source. For example, the cosmetic material may be disposed in a bottle, and may be in a fluid or semi-fluid form of varying viscosity. In such embodiments, it may be desired to have a wiper that removes some of the cosmetic product from the applicator head, or at least regions of the applicator head.

The wiper may have a conventional shape. For example, the wiper may have a conical shape, wherein the larger opening in the wiper tapers down to a smaller opening that is immediately adjacent the product in the bottle. Alternatively, the wiper may have an annular shape, with a flexible edge that undulates upwardly or downwardly as the applicator head is withdrawn from the bottle or is returned into the bottle. However, FIGS. 42-44 illustrate other, alternative embodiments of a wiper to be used with the helical applicator head according to the present invention.

FIG. 42 illustrates a portion of a surface 4212 in combination with a wiper 4281. The wiper 4281 would be disposed at the opening or port of a conventional bottle of cosmetic product, such as illustrated in FIGS. 46 and 47 that follow. The wiper 4281 has an inner thread 4283. While it is preferred that the pitch of the thread is the same or similar to that of the helical applicator surface 4212, it is also possible that the pitches are substantially dissimilar. The thread 4283 may remove cosmetic product from the outwardly-facing surface of the surface 4212, as well as from a region of the more inwardly-facing surface of the surface 4212. Alternatively, the thread 4283 may be spaced from the surface 4212 to limit the amount of cosmetic product without removing the product entirely, or guide the retention or application of the cosmetic product to the applicator surface 4212. Rotation of the applicator surface 4212 may assist in moving the surface 4212 past the wiper 4281, such that the wiper 4281 may be suited for use with an automated applicator with a drive for rotating the surface 4212 automatically.

FIG. 43 illustrates a portion of a surface 4312 in combination with a wiper 4381. The wiper 4381 would be used with a bottle of cosmetic product having an annular shape, thus permitting a first wiper blade 4383 to be disposed outside the surface 4312 and a second wiper blade 4385 to be disposed inside the surface 4312. In this fashion, cosmetic product may be removed from the inwardly-facing surface and the outwardly-facing surface of the surface 4312 prior to application. The presence of outer and inner blades 4383, 4385 may also cause disruption of any product extending between adjacent regions of the coil along the longitudinal axis.

FIG. 44 illustrates a portion of a surface 4412 in combination with a wiper 4481, similar to the embodiments of FIGS. 42 and 43, but also includes a core 4487. The wiper 4481 removes product from the outwardly-facing surface of the surface 4412, and potentially may cause disruption of any product extending between adjacent regions of the coil along the longitudinal axis. The core 4487 may also remove product from the inwardly-facing surface of the surface 4412. Alternatively, the core 4487 may limit or guide application of the product in the first instance to the inwardly-facing surface of the surface 4412. This may be done by having the core 4487 contact the inwardly-facing surface of the surface 4412, although the core 4487 may be spaced from the inwardly-facing surface as well.

In fact, the shape, surface treatment and placement of the core 4487 may be varied to limit or guide application of the product. A non-limiting, exemplary set of variations in the shape of the core 4487 is illustrated in FIGS. 45A-E. As illustrated in FIG. 45A, the cross-section of the core 4487 may be solid. Alternatively, as illustrated in FIG. 45B, the cross-section of the core 4487 may be crescent-shaped. As a still further alternative, illustrated in FIG. 45C, the core 4487 may have slits that are formed in the outer surface of the core 4487 parallel to the longitudinal axis of the core 4487. For that matter, the core 4487 may have a helical grove formed therein, as illustrated in FIG. 45D, which groove may have a different pitch, handedness, etc. than that of the applicator surface 4412. The core 4487 may also have grooves that run about the surface in planes orthogonal to the longitudinal axis of the core 4487, as illustrated in FIG. 45E. Additionally, the core 4487 need not be aligned with the one or more longitudinal axes of the helical applicator surface, as illustrated.

The core 4487 may be advanced within the surface 4412 using a number of different mechanisms. For example, the core 4487 may be defined by a rod that is disposed within the stem in a first state, and that is advanced into the hollow space within the core 4487 in a second state. A control surface coupled directly to the rod and moveable along a slot between a first position, corresponding to the first state, and a second position, correspondence to the second state may be used, as may a number of other control surfaces and connections. Alternatively, the core may be defined within a bottle or holder, and the surface 4412 may receive the core 4487 within the hollow space within the surface 4412 as the surface 4412 is advanced into the bottle or holder. According to certain embodiments, as the surface 4412 is advanced into the bottle or holder, the surface 4412 compresses as it receives the core 4487 within the hollow space defined by the surface 4412.

Additionally, it may be possible for the applicator according to the present disclosure to be used with mechanisms for cleaning the applicator head between uses. That is, the mechanisms for cleaning the applicator head may be used between one or more contacts of the applicator surface with the eyelashes of the user. It will be recognized that the cleaning mechanism may be used after each contact, such that any residual product is removed from the applicator surface before the applicator surface is again brought in contact with the eyelashes. Alternatively, the cleaning mechanism may be used after several such contacts, to remove residual product that has built up on the applicator surface over time.

In any event, the cleaning mechanism may be in the form of a container with cleaning solution disposed therein, the container having a port through which a part or all of the applicator head may be passed. According to certain embodiments, the cleaning solution may be used alone to remove the product from the applicator surface. According to other embodiments, the solution may be agitated to induce motion in the solution, thereby assisting removal of the product from the applicator surface. Further, the head may be vibrated, through the use of an internal or external vibratory generator, to assist in the removal of product. Still further, a brush or other tool may be brought into contact with the head, and one or both of the brush/tool and the head moved to assist in the removal of the product. For that matter, the brush or other tool may be used without the cleaning solution to remove product from the applicator surface.

Assembly of Applicator System

The applicator 100, according to any of the embodiments described above, may be manufactured as a single unit. That is, the handle 102 may be attached to the stem 104, and the stem 104 attached to the head 110. Moreover, attempts to detach the stem 104 from the handle 102 may result in damage to one or both of the stem 104 and the handle 102. The applicator 100 may be packaged and sold together with a bottle of the cosmetic, mascara for example.

Similarly, the applicator 200 may be manufactured as a single unit. That is, the applicator head 210 may be coupled to the drive 220 in such a fashion that attempts to decouple the applicator head 210 from the drive 220 may result in damage to one or both of the head 210 and the drive 220, rendering the head 210 and/or drive 220 inoperable. Alternatively, the applicator head 210 and/or drive 220 may be coupled to the handle 202 to the same effect. The applicator 200 may also be packaged and sold together with a bottle of the cosmetic, mascara for example.

However, the components of the applicator 100, 200 may also be manufactured so as to be packaged and sold separately. Two examples of such systems are shown in FIGS. 46 and 47.

As shown in FIGS. 46 and 47, an applicator head 4610, 4710 (with or without the stem) may be selectively detachable from the drive 4720 and/or handle 4602, 4702, such that a variety of heads 4610, 4710 may be used with a given drive 4720 and/or handle 4602, 4702. After this fashion, the user may be permitted to change between applicator heads 4610, 4710 having different applicator element profiles or applicator element distributions without the need to obtain or purchase more than a single handle 4602 or a single drive 4720/handle 4702 unit. According to these embodiments, one or more applicator heads 4610, 4710 and a handle 4602 or drive 4720/handle 4702 unit may be packaged and sold as a kit, and applicator heads 4610, 4710 may be packaged and sold separately from a handle 4602 or drive 4720/handle 4702 as refills or replacements.

Moreover, following along these lines, the applicator head 4610, 4710 may be packaged and sold as a unit 4690, 4790 with a holder or a bottle 4692, 4792. According to embodiments such as are shown in FIGS. 38-40, the source of cosmetic product (mascara, for example) is disposed within the head, and the holder 4692, 4792 prevents contact with the applicator head 4610, 4710 and source when not in use. According to other embodiments, the bottle 4692, 4792 may be a bottle containing the cosmetic product. In certain embodiments, the applicator head 4610, 4710 may include a threaded portion 4694, 4794 that engages a similarly threaded portion 4696, 4796 of the bottle 4692, 4792. The head 4610, 4710 may then be coupled to the handle 4602 or the drive 4720/handle 4702 at the time of use. The handle 4602 or the drive 4720/handle 4702 could be packaged and sold with the combination 4690, 4790 of the head 4610, 4710 and bottle 4692, 4792 as part of a kit, or the handle 4602 and the drive 4720/handle 4702 could be packaged and sold separately from the head 4610, 4710/bottle 4692, 4792.

It will be recognized that the head 4610, 4710 is not the only component of the applicator that may be packaged and sold separately. For example, as also illustrated in FIG. 47, the power source 4724 may be selectively detachable from the remainder of the drive 4720. Furthermore, the power source 4724 may be coupled with a drive circuit 4732 to form a type of intelligent power source 4734 that may not only provide voltage and current to the motor, but also may control the speed of the applicator head 4710 to provide a non-fixed rotational speed, or provide some other control function (directionality of motion, for example). After this fashion, selection and combination of one intelligent power source 4734 or another with the remainder of the drive 4720 may significantly influence the performance of the applicator 4700. According to another embodiment, the head 4710 and the power source 4734 may be packaged and sold separately from the drive 4720/handle 4702.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An applicator comprising:
   a handle; and
   an applicator head having two ends, one free end, and the other end coupled to the handle,
   the applicator head comprising at least one helical applicator surface, the at least one helical applicator surface disposed about a hollow space that extends from one end to the other end and being longitudinally coextensive therewith, and a plurality of projections attached only to a section of the at least one helical applicator surface facing the hollow space, the plurality of projections depending into the hollow space.

2. The applicator of claim 1, wherein the helical applicator surface is defined by a coil.

3. The applicator of claim 1, wherein the applicator head comprises a plurality of helical applicator surfaces disposed about a hollow space, at least one of the plurality of helical applicator surface having a plurality of projections attached only to a section of the at least one of the plurality of helical applicator surface facing the hollow space, the plurality of projections depending into the hollow space.

4. The applicator of claim 3, wherein each of the plurality of helical applicator surfaces has a plurality of projections attached only to a section of the each of the plurality of helical applicator surfaces facing the hollow space, the plurality of projections depending into the hollow space.

5. The applicator of claim 1, wherein the plurality of projections comprise a plurality of knob-like projections depending from the helical applicator surface.

6. The applicator of claim 1, wherein the plurality of projections comprises a plurality of rod-like projections attached at one end to the helical applicator surface.

7. The applicator of claim 1, wherein the plurality of projections comprises a plurality of plate-like projections attached at one end to the helical applicator surface.

8. The applicator according to claim 1, wherein the helical applicator surface has a different color than at least one of the plurality of projections.

9. The applicator according to claim 8, wherein the at least one of the plurality of projections has a chromatic color, and the helical applicator surface has a non-chromatic color.

10. The applicator according to claim 1, wherein the head comprises a plurality of helical applicator surfaces, as least one of the helical applicator surfaces having a different color than the others of the plurality of helical applicator surfaces.

11. The applicator according to claim 10, wherein the at least one of the helical applicator surfaces has a chromatic color, and the others of the plurality of helical applicator surface has a non-chromatic color.

12. An applicator comprising:
    a handle; and
    an applicator head having two ends, one free end, and the other end coupled to the handle,
    the applicator head comprising at least one helical applicator surface, the at least one helical applicator surface disposed about a hollow space that extends from one end to the other end and being longitudinally coextensive therewith, and a plurality of projections attached only to a section of the at least one helical applicator surface facing the hollow space,
    the plurality of projections having a first end attached to the at least one helical applicator surface and a second end depending into the hollow space.

13. The applicator of claim 8, wherein the first ends of the plurality of projections are uniformly spaced along the at least one helical applicator surface.

14. The applicator of claim 9, wherein the plurality of projections are uniformly spaced along the at least one helical applicator surface.

15. The applicator of claim 8, wherein the applicator head comprises a plurality of helical applicator surfaces disposed about a hollow space, at least one of the plurality of helical applicator surfaces having a plurality of projections attached only to a section of the at least one of the plurality of helical applicator surfaces facing the hollow space, the plurality of projections having a first end attached to the at least one helical applicator surface and a second end depending into the hollow space.

16. The applicator of claim 8, wherein the plurality of projections comprise a plurality of knob-like projections depending from the helical applicator surface.

17. The applicator of claim 8, wherein the plurality of projections comprises a plurality of rod-like projections attached at one end to the helical applicator surface.

18. The applicator of claim 8, wherein the plurality of projections comprises a plurality of plate-like projections attached at one end to the helical applicator surface.

19. The applicator according to claim 1, wherein the helical applicator surface has a different color than the plurality of projections.

20. The applicator according to claim 8, wherein the projections have a chromatic color, and the helical applicator surface has a non-chromatic color.

21. The applicator according to claim 1, wherein the head comprises a plurality of helical applicator surfaces, as least one of the helical applicator surfaces having a different color than the others of the plurality of helical applicator surfaces.

22. The applicator according to claim 10, wherein the at least one of the helical applicator surfaces has a chromatic color, and the others of the plurality of helical applicator surface has a non-chromatic color.

23. An applicator comprising:
    a handle; and
    an applicator head having two ends, one free end, and the other end coupled to the handle,
    the applicator head comprising at least one helical applicator surface, the at least one helical applicator surface disposed about a hollow space that extends from one end to the other end and being longitudinally coextensive therewith, and a plurality of projections attached to a section of the at least one helical applicator surface, the plurality of projections attached integrally and continuously to a section of the applicator surface, such that the profile of the head in a first section has a first cross-sectional area and the profile of the head in a second section has a second cross-sectional area.

24. The applicator according to claim 23, wherein the effective pitch in the first section is a first value, and the effective pitch in the second section is a second value different from the first value.

25. The applicator according to claim 23, comprising a drive coupled to the helical applicator surface to automatically move the helical applicator surface relative to the handle.

* * * * *